(12) United States Patent
Wang et al.

(10) Patent No.: US 12,254,891 B2
(45) Date of Patent: Mar. 18, 2025

(54) TARGETED VOICE SEPARATION BY SPEAKER FOR SPEECH RECOGNITION

(71) Applicant: GOOGLE LLC, Mountain View, CA (US)

(72) Inventors: Quan Wang, Hoboken, NJ (US); Ignacio Lopez Moreno, New York, NY (US); Li Wan, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 119 days.

(21) Appl. No.: 17/619,648

(22) PCT Filed: Oct. 10, 2019

(86) PCT No.: PCT/US2019/055539
§ 371 (c)(1),
(2) Date: Dec. 16, 2021

(87) PCT Pub. No.: WO2021/071489
PCT Pub. Date: Apr. 15, 2021

(65) Prior Publication Data
US 2022/0301573 A1    Sep. 22, 2022

(51) Int. Cl.
*G10L 21/028*        (2013.01)
*G10L 17/02*         (2013.01)
(Continued)

(52) U.S. Cl.
CPC ............ *G10L 21/028* (2013.01); *G10L 17/02* (2013.01); *G10L 17/04* (2013.01); *G10L 17/18* (2013.01); *G10L 21/0232* (2013.01)

(58) Field of Classification Search
CPC ....... G10L 21/028; G10L 17/02; G10L 17/04; G10L 17/18; G10L 21/0232
See application file for complete search history.

(56) References Cited

U.S. PATENT DOCUMENTS 6,502,067 B1   12/2002   Hegger et al.
7,243,060 B2   7/2007    Atlas et al.
(Continued)

OTHER PUBLICATIONS

Huang, P. et al., "Deep learning for monaural speech separation," in Acoustics, Speech and Signal Processing (ICASSP), 2014 IEEE International Conference; pp. 1562-1566; 2014 2014.
(Continued)

*Primary Examiner* — Douglas Godbold
*Assistant Examiner* — Edward Tracy, Jr.
(74) *Attorney, Agent, or Firm* — Gray Ice Higdon

(57) ABSTRACT

Processing of acoustic features of audio data to generate one or more revised versions of the acoustic features, where each of the revised versions of the acoustic features isolates one or more utterances of a single respective human speaker. Various implementations generate the acoustic features by processing audio data using portion(s) of an automatic speech recognition system. Various implementations generate the revised acoustic features by processing the acoustic features using a mask generated by processing the acoustic features and a speaker embedding for the single human speaker using a trained voice filter model. Output generated over the trained voice filter model is processed using the automatic speech recognition system to generate a predicted text representation of the utterance(s) of the single human speaker without reconstructing the audio data.

14 Claims, 10 Drawing Sheets

(51) Int. Cl.
  *G10L 17/04* (2013.01)
  *G10L 17/18* (2013.01)
  *G10L 21/0232* (2013.01)

(56) References Cited

U.S. PATENT DOCUMENTS

| | | | |
|---|---|---|---|
| 8,682,667 B2 | 3/2014 | Haughay | |
| 10,522,167 B1* | 12/2019 | Ayrapetian | G10L 17/18 |
| 11,217,254 B2 | 1/2022 | Wang et al. | |
| 2011/0188671 A1* | 8/2011 | Anderson | G10L 21/0232 |
| | | | 381/94.3 |
| 2014/0350943 A1 | 11/2014 | Goldstein | |
| 2015/0025887 A1 | 1/2015 | Sidi et al. | |
| 2015/0046157 A1 | 2/2015 | Wolff et al. | |
| 2016/0217792 A1 | 7/2016 | Gorodetski et al. | |
| 2016/0240210 A1 | 8/2016 | Lou | |
| 2017/0270919 A1 | 9/2017 | Parthasarathi et al. | |
| 2017/0337924 A1* | 11/2017 | Yu | G10L 17/18 |
| 2018/0082692 A1* | 3/2018 | Khoury | G10L 17/04 |
| 2018/0088899 A1* | 3/2018 | Gillespie | G10L 25/48 |
| 2019/0066713 A1 | 2/2019 | Mesgarani et al. | |
| 2019/0304069 A1* | 10/2019 | Vogels | G06N 20/00 |
| 2019/0318754 A1 | 10/2019 | Le Roux et al. | |
| 2020/0013425 A1* | 1/2020 | Bergmann | G10L 21/0272 |
| 2020/0135209 A1 | 4/2020 | Delfarah et al. | |
| 2020/0227064 A1 | 7/2020 | Xu et al. | |
| 2020/0342857 A1 | 10/2020 | Moreno et al. | |
| 2022/0122611 A1 | 4/2022 | Wang et al. | |
| 2023/0116052 A1* | 4/2023 | Eskimez | G10L 15/20 |
| | | | 704/223 |

OTHER PUBLICATIONS

Wang, Y. et al., "On training targets for supervised speech separation," IEEE/ACM Transactions on Audio, Speech and Language Processing (TASLP), vol. 22, No. 12, pp. 1849-1858, 2014 2014.
Du, J. et al., "A regression approach to single-channel speech separation via high-resolution deep neural networks," IEEE/ACM Transactions on Audio, Speech, and Language Processing, vol. 24, No. 8, pp. 1424-1437, 2016 2016.
Chen, Z. et al., "Deep attractor network for single-microphone speaker separation," in Acoustics, Speech and Signal Processing (ICASSP), 2017 IEEE International Conference; pp. 246-250; 2017.
Fu, S. et al., "Raw waveform-based speech enhancement by fully convolutional networks," arXiv preprint arXiv:1703.02205, 7 pages; 2017.
Pascual, S. et al., "Segan: Speech enhancement generative adversarial network," arXiv preprint arXiv: 1703.09452, 5 pages; 2017.
Wilson, K. et al., "Exploring tradeoffs in models for low-latency speech enhancement," in International Workshop on Acoustic Signal Enhancement (iWAENC); 5 pages; 2018.
Heigold, G. et al., "End-to-end text-dependent speaker verification," in Acoustics, Speech and Signal Processing (ICASSP); IEEE; pp. 5115-5119; 2016.
Wan, L. et al., "Generalized end-to-end loss for speaker verification," in Acoustics, Speech and Signal Processing (ICASSP); IEEE; 5 pages; 2018.
Zmolikova, K. et al., "Speaker-aware neural network based beamformer for speaker extraction in speech mixtures," in Interspeech; 5 pages; 2017.
Wang, Q. et al., "Speaker diarization with lstm," in Acoustics, Speech and Signal Processing (ICASSP); IEEE; 5 pages; 2018.
Jia, Y. et al., "Transfer learning from speaker verification to multispeaker text-to-speech synthesis," in Conference on Neural Information Processing Systems (NIPS); 11 pages; 2018.
Panayotov, V. et al., "Librispeech: an asr corpus based on public domain audio books, " in Acoustics, Speech and Signal Processing (ICASSP); IEEE International Conference; pp. 5206-5210; 2015.

Nagrani, A. et al., "Voxceleb: a large-scale speaker identification dataset," arXiv preprint arXiv: 1706.08612; 5 pages; 2017.
Chung, J. et al., "Voxceleb2: Deep speaker recognition," arXiv preprint arXiv: 1806.05622; 6 pages; 2018.
Michaely, A. et al., "Unsupervised context learning for speech recognition," in Spoken Language Technology Workshop (SLT); IEEE; pp. 447-453; 2016.
Vincent, E. et al., "Performance measurement in blind audio source separation," IEEE Transactions on Audio, Speech, and Language Processing (TASLP), vol. 14, No. 4, pp. 1462-1469, 2006.
Cherry, E., "Some experiments on the recognition of speech, with one and with two ears," The Journal of the Acoustical Society of America, vol. 25, No. 5, pp. 975-979, 1953.
Yu, D. et al., "Permutation invariant training of deep models for speaker-independent multi-talker speech separation," in Proceedings of International Conference on Acoustics, Speech and Signal Processing (ICASSP); IEEE; pp. 241-245; 2017.
Dehak, N. et al., "Front-end factor analysis for speaker verification;" IEEE Transactions on Audio, Speech, and Language Processing; vol. 19, No. 4; pp. 788-798; 2010.
Wang, J. et al., "Deep extractor network for target speaker recovery from single channel speech mixtures," arXiv preprint arXiv:1807.08974; 5 pages; 2018.
Delcroix, M. et al., "Single channel target speaker extraction and recognition with speaker beam," in 2018 IEEE International Conference on Acoustics, Speech and Signal Processing (ICASSP); IEEE; pp. 5554-5558; 2018.
Wang, Q. et al., "Voicefilter: Targeted voice separation by speaker-conditioned spectrogram masking," arXiv preprint arXiv: 1810.04826; 5 pages; 2018.
He, Y. et al., "Streaming end-to-end speech recognition for mobile devices," in International Conference on Acoustics, Speech and Signal Processing (ICASSP); IEEE; pp. 6381-6385; 2019.
Griffin, D. et al., "Signal estimation from modified short-time fourier transform;" IEEE Transactions on Acoustics, Speech, and Signal Processing, vol. 32, No. 2, pp. 236-243, 1984.
Ko, T. et al. "A study on data augmentation of reverberant speech for robust speech recognition," in 2017 IEEE International Conference on Acoustics, Speech and Signal Processing (ICASSP); IEEE; pp. 5220-5224; 2017.
Alvarez, R. et al., "On the efficient representation and execution of deep acoustic models," arXiv preprint arXiv:1607.04683; 5 pages; 2016.
Hershey, J. et al., "Deep clustering: Discriminative embeddings for segmentation and separation," in Acoustics, Speech and Signal Processing (ICASSP), 2016 IEEE International Conference; pp. 31-35; 2016.
Kolbæk, M. et al., "Multitalker speech separation with utterance-level permutation invariant training of deep recurrent neural networks," IEEE/ACM Transactions on Audio, Speech and Language Processing (TASLP), vol. 25, No. 10, pp. 1901-1913, 2017.
Xiao, X. et al., "Single-Channel Speech Extraction Using Speaker Inventory and Attention Network;" International Conference on Acoustics, Speech and Signal Processing (ICASSP), IEEE; pp. 86-90; May 12, 2019 May 12, 2019.
Hetherly, J. et al., "Deep Speech Denoising with Vector Space Projections;" Cornell University; arXiv.org; arXiv:1804.10669v1; 5 pages; Apr. 27, 2018 Apr. 27, 2018.
European Patent Office; International Search Report and Written Opinion of PCT application Ser. No. PCT/US2019/055539; 12 pages; dated May 8, 2020 May 8, 2020.
European Patent Office; Communication pursuant to Article 94(3) issued in Application No. 19795718.6, 4 pages, dated Aug. 10, 2022.
Intellectual Property India; First Examination Report issued in Application No. 202127058250; 5 pages; dated Jun. 23, 2022.
European Patent Office, Intention to Grant issued in Application No. 19795718.6; 62 pages; dated May 23, 2024.
Intellectual Property India; Hearing Notice issued in Application No. 202127058250; 2 pages; dated Jul. 12, 2024.

* cited by examiner

TARGETED VOICE SEPARATION BY SPEAKER FOR SPEECH RECOGNITION

BACKGROUND

An automated assistant (also known as a "personal assistant", "mobile assistant", etc.) may be interacted with by a user via a variety of client devices such as smart phones, tablet computers, wearable devices, automobile systems, standalone personal assistant devices, and so forth. An automated assistant receives input from the user including spoken natural language input (i.e., utterances) and may respond by performing an action, by controlling another device and/or providing responsive content (e.g., visual and/or audible natural language output). An automated assistant interacted with via a client device may be implemented via the client device itself and/or via one or more remote computing devices that are in network communication with the client device (e.g., computing device(s) in the cloud).

An automated assistant can convert audio data, corresponding to a spoken utterance of a user, into corresponding text (or other semantic representation). For example, audio data can be generated based on the detection of a spoken utterance of a user via one or more microphones of a client device that includes the automated assistant. The automated assistant can include a speech recognition engine that attempts to recognize various characteristics of the spoken utterance captured in the audio data, such as the sounds produced (e.g., phonemes) by the spoken utterance, the order of the pronounced sounds, rhythm of speech, intonation, etc. Further, the speech recognition engine can identify text words or phrases represented by such characteristics. The text can then be further processed by the automated assistant (e.g., using a natural language understanding engine and/or a dialog state engine) in determining responsive content for the spoken utterance. The speech recognition engine can be implemented by the client device and/or by one or more automated assistant component(s) that are remote from, but in network communication with, the client device.

SUMMARY

Techniques described herein are directed to isolating a human voice from a frequency representation of an audio signal by generating a predicted mask using a trained voice filter model, wherein the frequency representation is generated using an automatic speech recognition (ASR) engine, and where processing the frequency representation with the predicted mask can isolate portion(s) of the frequency representation corresponding to the human voice. The revised frequency representation generated by processing the frequency representation using the predicted mask can be processed using additional portions of the ASR engine to, for example, generate a text representation (e.g., text, a symbolic representation of text, etc.) of utterance(s) spoken by the isolated human voice. In other words, a voice filter model can be used in processing acoustic features (e.g., the frequency representation) and generating revised acoustic features (e.g., the revised frequency representation) isolating portion(s) of the acoustic features corresponding to utterance(s) of a single human for use in an automatic speech recognition without reconstruction of the audio signal(s) from the features.

For example, assume a sequence of audio data that includes first utterance(s) from a first human speaker, second utterance(s) from a second human speaker, and various occurrences of background noise. Implementations disclosed herein can utilize a frequency representation of the sequence of audio data generated using an ASR engine to generate a revised frequency representation that includes portion(s) corresponding to the utterance(s) from the first human speaker, and excludes portion(s) corresponding to the second utterance(s) and the background noise, where the revised frequency representation can be further utilized by an ASR engine without reconstruction of an additional audio signal corresponding to the revised frequency representation.

The voice filter model can be used to process a speaker embedding corresponding to the human speaker in addition to the frequency representation of the audio data to generate the predicted mask. For instance, a speaker embedding corresponding to the first human speaker can be processed in addition to the sequence of audio data to generate a predicted mask which can be utilized to isolate utterance(s) of the first human speaker. In many implementations, a speaker embedding can be generated prior to processing the sequence of audio data during an enrollment process (i.e., a pre-generated speaker embedding). The sequence of audio data can be associated with the pre-generated speaker embedding after verification of the first human speaker (e.g., using voice fingerprinting and/or other biometric verification(s)). Utilizing a pre-generated speaker embedding can enable real-time automatic speech recognition of the sequence of audio data.

In some additional or alternative implementations, a speaker embedding utilized in generating a revised frequency representation can be based on one or more instances of the sequence of audio data itself. For example, a voice activity detector (VAD) can be utilized to determine a first instance of voice activity in the audio data, and portion(s) of the first instance can be utilized in generating a first speaker embedding for a first human speaker. For example, the first speaker embedding can be generated based on processing, using a speaker embedding model, features of the first X (e.g., 0.5, 1.0, 1.5, 2.0) second(s) of the first instance of voice activity (the first instance of voice activity can be assumed to be from a single speaker). The first speaker embedding can then be utilized to generate a first revised frequency representation that isolates utterance(s) of the first speaker as described herein.

A speech recognition model portion of the ASR engine can be utilized to process acoustic features such as the frequency representation of audio data to generate the predicted text representation of the audio data. In many implementations, the audio data can be processed using a frequency transformation such as a Fourier transform (e.g., a fast Fourier transform, a discrete Fourier transform, and/or additional Fourier transform(s)) to generate the frequency representation of the audio data. In many implementations, a filterbank representation (e.g., a filterbank energy representation of the amount of energy captured in each frequency band of the frequency representation) can be processed using the ASR model to generate the predicted text representation. In some such implementations, the frequency representation can be processed using a filterbank transformation to generate the filterbank representation.

Voice filter models disclosed herein can be utilized in generating a revised frequency representation of a Fourier transform frequency representation, where the revised Fourier transform frequency representation can be processed using the filterbank transform to generate a filterbank representation, and where the filterbank representation can be processed using the ASR model to generate the predicted text representation. Additionally or alternatively, voice filter models can be utilized in generating a revised frequency representation of the filterbank representation, where a Fourier transform representation of the audio data is processed using the filterbank transformation to generate the filterbank frequency representation prior to processing the frequency representation using the voice filter model, and where the revised filterbank frequency representation is processed using the ASR model to generate the predicted text representation.

Modern ASR systems frequently have an inherent robustness to background noise. As such, integrating a voice filter model with an ASR system can cause an over suppression by the voice filter model. In some such implementations, the voice filter model can be trained using an asymmetric loss function, where the asymmetric loss function is used in training a voice filter model more tolerant to under suppression errors and less tolerant to over suppression errors. Additionally or alternatively, an adaptive suppression strength can be utilize at run time to reduce over suppression by the voice filter model, where the adaptive suppression strength can dynamically suppress how much of the frequency representation is filtered based on the amount, type, etc. of additional noise in the audio data (e.g., the type of background noise, the number of additional speaker(s), etc.).

Accordingly, various implementations set forth techniques for isolating utterance(s) of a human speaker in captured audio data utilizing a trained voice filter model which can be integrated with an ASR system. In many implementations, the voice filter model can be used in processing acoustic features of the captured audio generated using the ASR system (i.e., processing a frequency representation of the audio data generated using the ASR system). Moreover, a revised version of the acoustic features, which isolate the utterance(s) of the human speaker generated using the voice filter model (i.e., the revised frequency representation generated using the voice filter model), can be additionally processed using the ASR system to generate predicted text of the utterance(s) without the need to reconstruct the audio signal. Put another way, the revised version of the acoustic features can be directly processed using the ASR system, without first converting the acoustic features back to an audio waveform. Further, the revised version of the acoustic features can be generated based on acoustic features generated using the ASR system, and utilizing a voice filter model that is integrated as part of the ASR system. Processing ASR acoustic features to generate revised acoustic features can enable ASR to be performed more quickly and efficiently as the revised acoustic features are already in a format that is directly utilizable by the ASR system to generate predicted speech. Put another way, the revised acoustic features need not be converted back to a time domain representation and then subsequently processed to convert the time domain representation to a format acceptable to the ASR system. In these and other manners, voice filtering techniques can be integrated with an on-device ASR system to enable quick speech recognition.

Some implementations disclosed herein utilize one or more techniques to mitigate suppression, in audio data, of a target human speaker. Mitigating suppression of the target human speaker in the audio data can directly result in improved speech recognition performance by an ASR system the processes the audio data to generate the speech recognition. This can be due to, for example, the ASR system being trained based on non-suppressed human speech audio data, and having high error rates when processing suppressed human speech audio data. Such techniques that can mitigate suppression can include utilizing an asymmetric loss training function as described herein, utilizing an adaptive suppression strength at inference as described herein, and/or other technique(s) described herein. Absent these technique(s), portion(s) of the audio data corresponding to the targeted human speaker can be suppressed when filtering the audio data using the trained voice filter model. Again, such suppression can lead to an increase error rate in generating text corresponding to the targeted human speaker.

Utilizing an asymmetric loss when training the voice filter model in place of a conventional loss function (e.g., a L2 loss, a mean squared error loss, a cross-entropy loss, etc.) can result in a trained model which gives more tolerance to under suppression errors and less tolerance to over suppression errors. For example, an ASR system trained to have inherent robustness against background noise can filter out background noise in a sequence of audio data as part of generating predicted text. Integrating a voice filter model trained using a conventional loss function into this ASR system can result in an over suppression of the targeted human speaker. However, a voice filter model trained using an asymmetric loss function is trained to have less tolerance to these over suppression errors. In these and other manners, the integration of the voice filter model trained using the asymmetric loss function into the ASR system will lead to an increased accuracy of generated text.

Additionally or alternatively, an adaptive suppression strength utilized at run time can provide additional and/or alternative compensation for over suppression errors. For example, the ASR system can process a compensated frequency representation using an ASR model to generate the predicted text of the targeted human speaker, where the compensated frequency representation includes a dynamic weight of suppression. Utilizing the dynamic suppression strength can decrease the error rate from over suppression when integrated with a voice filter model in the ASR system compared to a voice filter model integrated in the ASR system without a dynamic suppression strength.

Furthermore, parameter(s) of the voice filter model can be quantized (e.g., quantized to 8 bit integers) which can reduce the consumption of computing resources (e.g., memory, battery power, processor cycle(s), etc.) when utilizing the voice filter model on a client device when compared to utilizing voice filter model parameter(s) which have not been quantized. This reduction in computing resources can aid in real time and/or on device ASR processing of audio data. For example, quantized voice filter models can enable the voice filter techniques described herein to be utilized on mobile phones or other client devices that have constrained processor and/or memory resources. As another example, quantized voice filter models can enable the voice filter techniques described herein to be utilized on mobile phones or other client devices even when resources of such devices are throttled due to overheating, low battery charge, and/or other condition(s).

Additionally or alternatively, a predicted text representation generated using the ASR system based on revised frequency representation can improve the accuracy of the voice-to-text relative to processing the frequency representation due to, for example, the revised frequency representation lacking background noise, utterance(s) of other user(s) (e.g., overlapping utterances), etc. The improved accuracy of text can increase accuracy of one or more downstream components that rely on the resulting text (e.g., natural language processor(s), module(s) that generate a response based on intent(s) and parameter(s) determined based on natural language processing of the text, etc.). Also, for example, when implemented in combination with an automated assistant and/or other interactive dialog system, the improved accuracy of text can lessen the chance that the interactive dialog system will incorrectly convert the spoken utterance to text, thereby reducing the likelihood of an erroneous response to the utterance by the dialog system. This can less and quantity of dialog turns that would otherwise be needed for a user to again provide the spoken utterance and/or other clarification(s) to the interactive dialog system.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
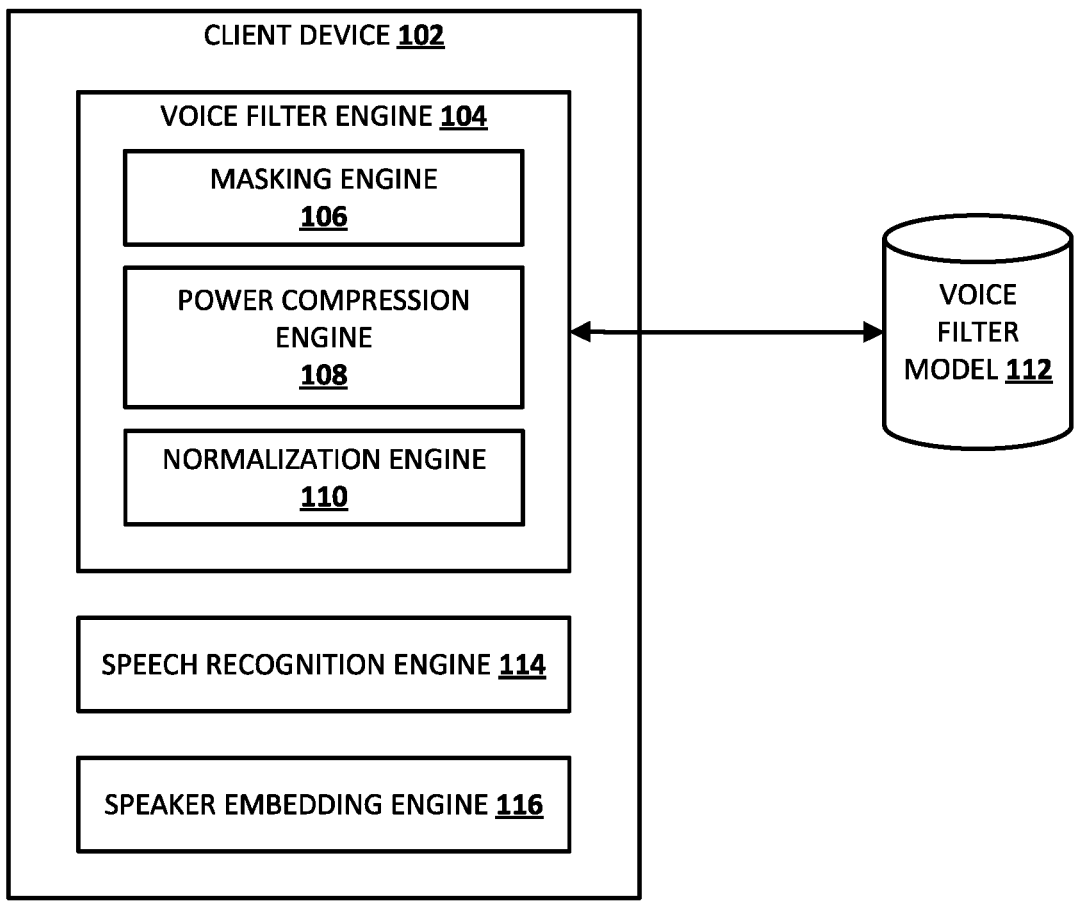
FIG. 1 illustrates a block diagram of an example environment in which various implementations disclosed herein can be implemented.

Techniques disclosed herein include training and utilizing a voice filter model, a single-channel source separation model that can run on a client device to preserve only the speech signals from a target user, as part of a streaming speech recognition system. Delivering such a model presents numerous challenges: It should improve the performance when the input signal consists of overlapped speech, and must not hurt the speech recognition performance under all other acoustic conditions. Additionally or alternatively, the voice filter model should be tiny, fast, and perform inference in a streaming fashion, in order to have minimal impact on CPU, memory, battery and latency. In many implementations, training and/or using the voice filter model includes using an asymmetric loss, adopting adaptive runtime suppression strength, and/or quantizing the model.

Integrating a speaker-conditioned speech separation model to production environments, especially on-device automatic speech recognition (ASR) systems presents a number of challenges. Quality wise, the model should not only improve the ASR performance when there are multiple voices, but also should be harmless to the recognition performance under other scenarios, e.g. when the speech is only from the target speaker, or when there are non-speech noise such as music present in the background. For streaming systems, to have minimal latency, bi-directional recurrent layers or temporal convolutional layers shall not be used in the model. For on-device systems, the model must be tiny and fast to add minimal budget in CPU and memory.

A voice filter model in accordance with many implementations can be used in achieving these goals. In some implementations, the voice filter model can operate as a frame-by-frame frontend signal processor to enhance the features consumed by a speech recognizer, without reconstructing audio signals from the features. During training, an asymmetric loss function can be utilized to penalize oversuppression which can make the model harmless under more acoustic environments. At runtime, an adaptive suppression strength can be utilized to dynamically adapt to different noise conditions. In many implementations, the voice filter model parameters can be quantized to 8-bit integers for faster inference.

In a variety of implementations, the focus of utilizing voice filter models can be improving ASR performance. Instead of reconstructing any audio waveform from a frequency representation of the audio data via an inverse frequency transformation, voice filtering can operate as a frame-by-frame frontend signal processor that directly takes acoustic features as input, and outputs enhanced acoustic features. Here the acoustic features are exactly the same features being consumed by ASR models, such that voice filtering doesn't even have its own frequency transformation operator. Since ASR models can take stacked log Mel filterbank energies as input, a voice filter model has two integration options: (1) taking FFT magnitudes as input, and outputs enhanced FFT magnitudes, which will be used to compute filterbank energies; (2) taking filterbank energies as input, and outputs enhanced filterbank energies.

As an illustrative example, FFT magnitudes are used as the acoustic features for a voice filter system. First, the FFT magnitudes for both noisy audio and clean audio can be power-law compressed with, for example, $y=x^{0.3}$ before being fed to the neural network or used to compute the loss function. The purpose of power-law compression is to equalize and/or partially equalize the importance of quieter sounds relative to loud ones.

Second, both the d-vectors (also referred to herein as speaker embeddings) and the power-law compressed FFT magnitudes are globally normalized using the means and standard deviations computed on a small subset of the training data before they are fed into the neural network. Performing global normalization of the network inputs as a separate operation will largely reduce quantization errors when the neural network parameters are quantized.

The neural network topology of the voice filter model is designed for minimal latency: (1) The convolutional layers can be 1D instead of 2D, meaning the convolutional kernels are for the frequency dimension only; (2) The LSTM layers can be uni-directional and able to take streaming inputs. In practice, since frequency-only 1D-CNN is not as powerful as 2D-CNN, many implementations of voice filter models remove these CNN layers and purely consist of LSTM layers.

In many implementations, it can be assumed the d-vector is available at runtime. Users are usually prompted to follow an enrollment process before enabling speaker verification or voice filtering. During this enrollment process, d-vectors are computed from the target user's recordings, and stored on the device. The enrollment is usually a one-off experience.

At training time, noisy audio can be generated by adding the waveforms from one or several interference audios to the waveform of the clean audio, with certain probability. For example, the interference audios can be either speech from other speakers, or non-speech noise from ambient recordings.

Modern ASR models are usually trained with intensively augmented data, such as with different types of background noise and under different reverberance conditions. Such ASR models already inherently have some robustness against noise. When adding a voice filtering component to an existing ASR system, it should be guaranteed that performance does not degrade under all noise conditions. In some instances, ASR performance can degrade when the voice filter model is enabled and, for example, non-speech noise is present. The majority part of the degraded Word Error Rate (WER) is from false deletions, which indicates significant over suppression by the voice filtering model.

To overcome the over suppression problem, a new loss function for spectrogram masking based speech separation/enhancement named asymmetric loss can be utilized. Let $S_{cln}(t, f)$ and $S_{enh}(t, f)$ denote the clean and enhanced time-frequency FFT magnitudes, respectively. A conventional L2 loss with compression of power 0.3 is defined as:

$$L=\Sigma_t \Sigma_f (S_{cln}^{0.3}(t,f) - S_{enh}^{0.3}(t,f))^2$$

In many implementations, it is desirable to be more tolerate to under-suppression errors, and less tolerate to over-suppression errors. Thus, an asymmetric penalty function $g_{asym}$ can be defined with penalty factor $\alpha>1$ for a system that can be more tolerant to under-suppression errors and less tolerant to over-suppression errors:

$$g_{asym}(x, \alpha) = \begin{cases} x & \text{if } x \geq 0 \\ \alpha \cdot x & \text{if } x < 0 \end{cases}$$

Then the asymmetric L2 loss function can be defined as:

$$L_{asym}=\Sigma_t \Sigma_f (g_{asym}(S_{cln}^{0.3}(t,f) - S_{enh}^{0.3}(t,f), \alpha))^2$$

As mentioned before, modern ASR models are usually already robust against non-speech noise. Having a voice filtering model that performs an additional step of feature masking can harm the ASR performance.

One way to mitigate the performance degradation is to have an additional compensation to the over-suppression at inference time. Let $S_{in}$ and $S_{enh}$ denote the input and enhanced FFT magnitudes, respectively, the final compensated output would be:

$$S_{out}=(w \cdot S_{enh}^p + (1-w) \cdot S_{in}^p)^{1/p}$$

Here w is the weight of suppression, and p is the compression power. When w=0, voice filtering is completely disabled; and when w=1, there is no compensation.

In practice, a larger w should be used when the voice filtering model improves ASR, and a smaller w should be used when it hurts ASR. For multi-talker speech, the FFT magnitudes usually have better separable energy bands than speech with non-speech noise. The above average rate (AAR), which is defined as the percentage of values that's larger than the mean value, is a good statistic that reflects this property. In many implementations, speech under non-speech noise tends to have larger AAR than speech under speech noise. Thus, the adaptive weight at time t can be defined as $$w^{(t)}=\beta \cdot w^{(t-1)} + (1-\beta) \cdot REC_{w_{min}}^{w_{max}}(a \cdot AAR(S_{in}^{(t)}) + b)$$

where $0 \leq \beta < 1$ is the moving average coefficient, a and b define a linear transform from AAR to weight, and $REC_{w_{min}}^{w_{max}}(\bullet)$ is a rectification function that clips values above $w_{max}$ or below $w_{min}$.

Raw TensorFlow graphs can store voice filter network parameters in 32-bit floating point values, and may not be well optimized for on-device inference. In many implementations, the voice filtering models can be serialized to the FlatBufferTensorFlow Lite format. Additionally or alternatively the network parameters can be quantized to 8-bit integers. This can reduce memory cost, and/or make use of optimized hardware instructions for integer arithmetic.

Turning initially to FIG. 1, an example environment is illustrated in which various implementations can be performed. FIG. 1 includes a client computing device 102. In many implementations, client device 102 can execute an instance of an automated assistant (not depicted).

The client computing device 102 may be, for example: a desktop computing device, a laptop computing device, a tablet computing device, a mobile phone computing device, a computing device of a vehicle of the user (e.g., an in-vehicle communications system, and in-vehicle entertainment system, an in-vehicle navigation system), a standalone interactive speaker, a smart appliance such as a smart television, and/or a wearable apparatus of a user that includes a computing device (e.g., a watch of the user having a computing device, glasses of the user having a computing device, a virtual or augmented reality computing device). Additional and/or alternative client computing devices may be provided.

The example environment illustrated in FIG. 1 includes voice filter engine 104, masking engine 106, power compression engine 108, normalization engine 110, automatic speech recognition (ASR) engine 114, speaker embedding engine 116, voice filter model 112, and/or additional engine(s) and/or additional model(s) (not depicted). Voice filter engine 104, masking engine 106, power compression engine 108, normalization engine 110, ASR engine 114, and speaker embedding engine 116 are example components in which techniques described herein may interface. The operations performed by one or more engines 104, 106, 108, 110, 114, and 116 of FIG. 1 may be distributed across multiple computing engines. In some implementations, one or more aspects of engines 104, 106, 108, 110, 114, and 116 may be combined into a single system and/or more aspects may be implemented on the client device 102. For example, in some of those implementations, aspects of voice filter engine 104 may be combined with aspects of speaker embedding engine 116. Engines in accordance with many implementations may each be implemented in one or more computing devices that communicate, for example, through a communication network. A communication network may include a wide area network such as the Internet one or more local area networks ("LAN"s) such as Wi-Fi LANs, mesh networks, etc., and/or one or more bus subsystems. A communication network may optionally utilize one or more standard communication technologies, protocols, and/or inter-process communication techniques.

Voice filter model 112 can be trained to process a frequency representation of an audio signal as well as a speaker embedding corresponding to a human speaker to generate a predicted mask, where the frequency representation can be processed with the predicted mask to generate a revised frequency representation isolating utterance(s) of the human speaker. In various implementations, voice filter model 112 can be trained as described herein in accordance with FIG. 2 and/or FIG. 6. In a variety of implementations, ASR engine 114 can process captured audio to determine a frequency representation of the audio data. In many implementations, the audio data can be captured in real time using one or more microphones of client device 102 (not depicted). For example, ASR engine 114 can generate a FFT frequency representation of the audio data, a filterbank representation of the audio data, and/or additional frequency representation(s) of the audio data.

In some implementations, the frequency representation generated using ASR engine 114 can be additionally processed using power compression engine 108 and/or normalization engine 110. For example, power compression engine 108 can be utilized to process the frequency representation using a power compression process to equalize (or partially equalize) the importance of quieter sounds relative to loud sounds in the audio data. Additionally or alternatively, normalization engine 110 can be utilized to normalize the frequency representation.

Speaker embedding engine 116 can determine a speaker embedding corresponding to a human speaker. In some implementations, speaker embedding engine 116 can process portion(s) of the captured audio data using a speaker embedding model (not depicted) to generate the speaker embedding. Additionally or alternatively, speaker embedding engine 116 can select a pre-generated speaker embedding (e.g., a speaker embedding previously generated using an enrollment process) using voice fingerprinting, image recognition, a passcode, and/or other verification techniques to determine the human speaker currently active and, as a result, the speaker embedding for the currently active human speaker. In many implementations, normalization engine 110 can normalize the selected speaker embedding.

Voice filter engine 104 can generate a revised frequency representation which isolates utterance(s) of the human speaker corresponding to the speaker embedding selected using speaker embedding engine 116. In many implementations, masking engine 106 can process the speaker embedding selected using speaker embedding engine 116 and the frequency representation generated using ASR engine 114 using voice filter model 112 to generate a predicted mask. Voice filter engine 104 can process the frequency representation using the predicted mask to generate the revised frequency representation. For example, voice filter engine 104 can convolve the frequency representation with the predicted mask to generate the revised frequency representation. Additionally or alternatively, ASR engine 114 can process the revised frequency representation generated using voice filter engine 104 to generate a predicted text representation of the isolated utterance(s) of the human speaker.

Figure 2:
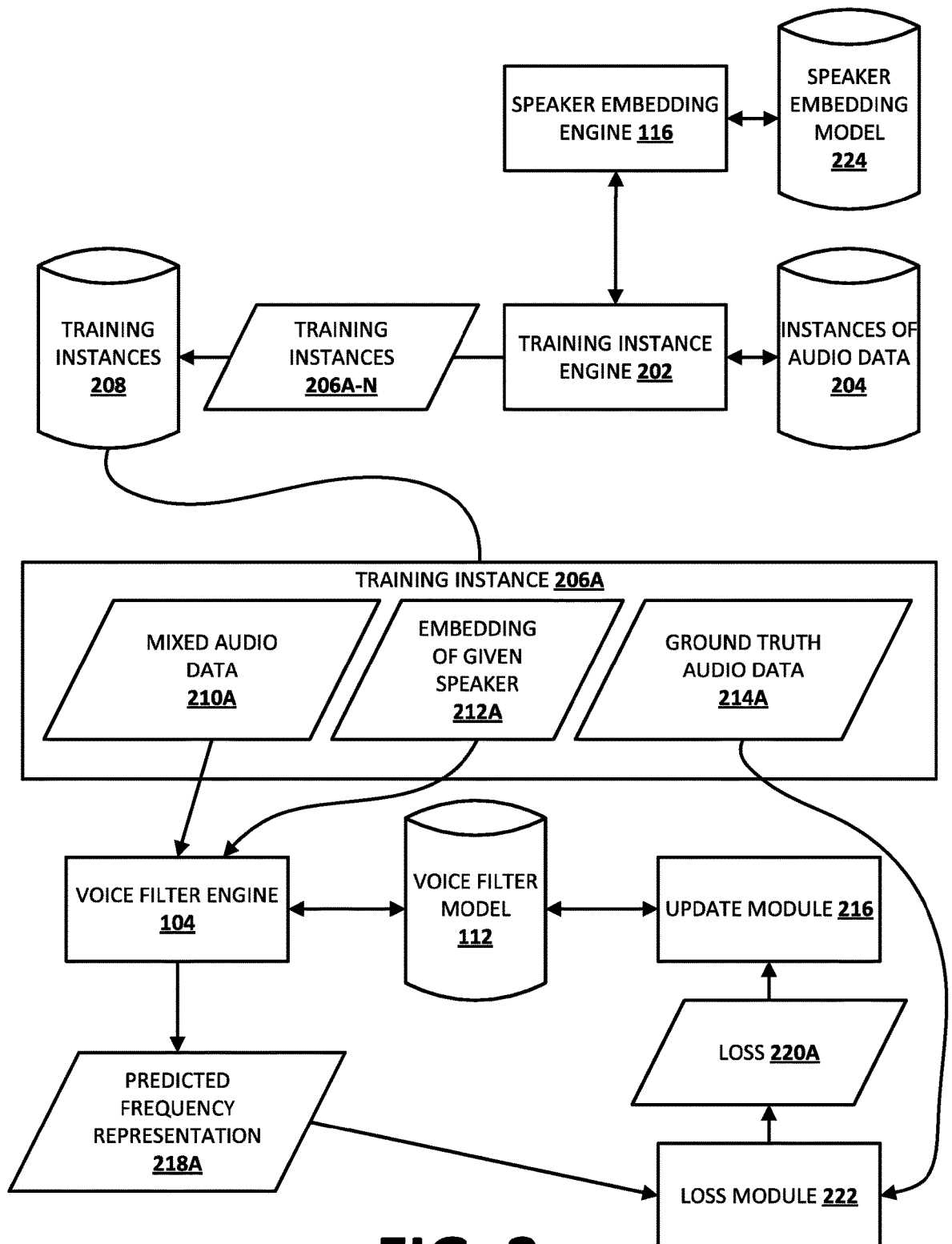
FIG. 2 illustrates an example of training a voice filter model in accordance with various implementations disclosed herein.

Turning to FIG. 2, an example of training a voice filter model 112 is illustrated. The voice filter model 112 can be a neural network model and can include a convolutional neural network portion, a recurrent neural network portion, a fully connected feed forward neural network portion, and/or additional neural network layers. The voice filter model 112 is trained to be used to generate, based on processing a frequency domain representation of audio data and a speaker embedding of a target human speaker, a revised frequency representation of the audio data that isolates utterance(s) (if any) of the target speaker. As described herein, the voice filter model 112 can be trained to accept as input, a frequency representation of the audio data (i.e., a frequency representation generated by processing the audio data with a frequency transformation portion of an ASR engine). As further described herein, the output is also generated using the speaker embedding of the target speaker. For example, the speaker embedding of the target speaker can be applied as input to one or more portions of the voice filter model. Accordingly, voice filter model 112, once trained, can be used to generate, as output of the voice filter model 122, a predicted mask which can be convolved with the frequency representation to generate a revised frequency representation. The revised frequency representation can be processed using additional and/or alternative portions of the ASR engine to, for example, generate a predicted text representation of the audio data.

Also illustrated is an training instance engine 202 that generates a plurality of training instances 206A-N, that are stored in training instances database 208 for use in training the voice filter model 112. Training instance 206A is illustrated in detail in FIG. 2. The training instance 206A includes a mixed instance of audio data 210A, an embedding of a given speaker 212A, and ground truth instance of audio data 210A that includes only utterance(s) from the given speaker corresponding to the embedding 212A. In many implementations, voice filter engine 104 can utilize a frequency transformation portion of an ASR engine to generate a mixed frequency representation based on the mixed instance of audio data 210A. Similarly, voice filter engine 104 can be utilized to generate a ground truth frequency representation of ground truth audio 214A using the frequency transformation portion of the ASR engine. Additionally or alternatively, training instance 206A can include a mixed frequency representation in addition to or in place of mixed instance of audio data 210A and/or a ground truth frequency representation in addition to or in place of ground truth audio data 214A.

The training instance engine 202 can generate the training instances 206A-N based on instances of audio data from instances of audio data database 204, and through interaction with speaker embedding engine 116. For example, the training instance engine 202 can retrieve the ground truth audio data 214A from the instances of audio data database 204—and use it as the ground truth audio data for the training instance 206A.

Further, the training instance engine 202 can provide an instance of audio data from the target speaker to the speaker embedding engine 114 to receive, from the speaker embedding engine 116, the embedding of the given speaker 212A. In many implementations, the speaker embedding engine 114 can process one or more segments of the ground truth audio data 214A using the speaker embedding model 124 to generate the embedding of the given speaker 212A. For example, the speaker embedding engine 112 can utilize a voice activity detector (VAD) to determine one or more segments of the ground truth audio data 214A that include voice activity, and determine the embedding of the given speaker 212A based on processing one or more of those segments using the speaker embedding model 224. For instance, all of the segments can be processed using the speaker embedding model 224, and the resulting final output generated based on the processing can be used as the embedding of the given speaker 212A. Also, for instance, a first segment can be processed using the speaker embedding model 224 to generate a first output, a second segment can be processed using the speaker embedding model 124 to generate a second output, etc.—and a centroid of the outputs utilized as the embedding of the given speaker 212A. Additionally or alternatively, speaker embedding engine 116 can determine a speaker embedding generated through an enrollment process which corresponds to a user profile associated with the client device.

The training instance engine 202 generates the mixed instance of audio data 210A by combining the ground truth audio data 214A with an additional instance of audio data from the instances of audio data database 204. For example, the additional instance of audio data can be one that includes one or more other human speaker(s) and/or background noise.

In training the voice filter model 112 based on the training instance 206A, the voice filter engine 104 applies a frequency representation of the mixed instance of audio data 210A as input to the CNN portion of the voice filter model to generate CNN output. Additionally or alternatively, voice filter engine 104 applies the embedding of the given speaker 212A as well as the CNN output as input to the RNN portion of voice filter model 122 to generate RNN output. Furthermore, the voice filter engine 104 applies the RNN output as input to a fully connected feed-forward portion of the voice filter model 112 to generate a predicted mask, which voice filter engine 104 can utilize in processing the mixed frequency representation (i.e., the frequency representation of the mixed instance of audio data 210A) to generate a predicted refined frequency representation 218A that isolates utterance(s) of the human speaker.

The loss module 222 generates a loss 220A as a function of: the predicted frequency representation 218A (i.e., a frequency representation of the audio data isolating utterance(s) of the human speaker) and a frequency representation of ground truth audio data 214A. The loss 220A is provided to update module 216, which updates voice filter model 112 based on the loss. For example, the update module 216 can update one or more weights of the voice filter model using backpropagation (e.g., gradient descent). In many implementations, loss module 222 can generate an asymmetric loss 220A to mitigate over suppression by voice filter model 112 when non-speech noise is present.

While FIG. 2 only illustrates a single training instance 206A in detail, it is understood that training instances database 208 can include a large quantity of additional training instances. The additional training instances can include training instances of various lengths (e.g., based on various durations of audio data), training instances with various ground truth audio data and speaker embeddings, and training instances with various additional sounds in the respective mixed instances of audio data. Moreover, it is understood that a large quantity of the additional training instances will be utilized to train voice filter model 112.

Figure 3:
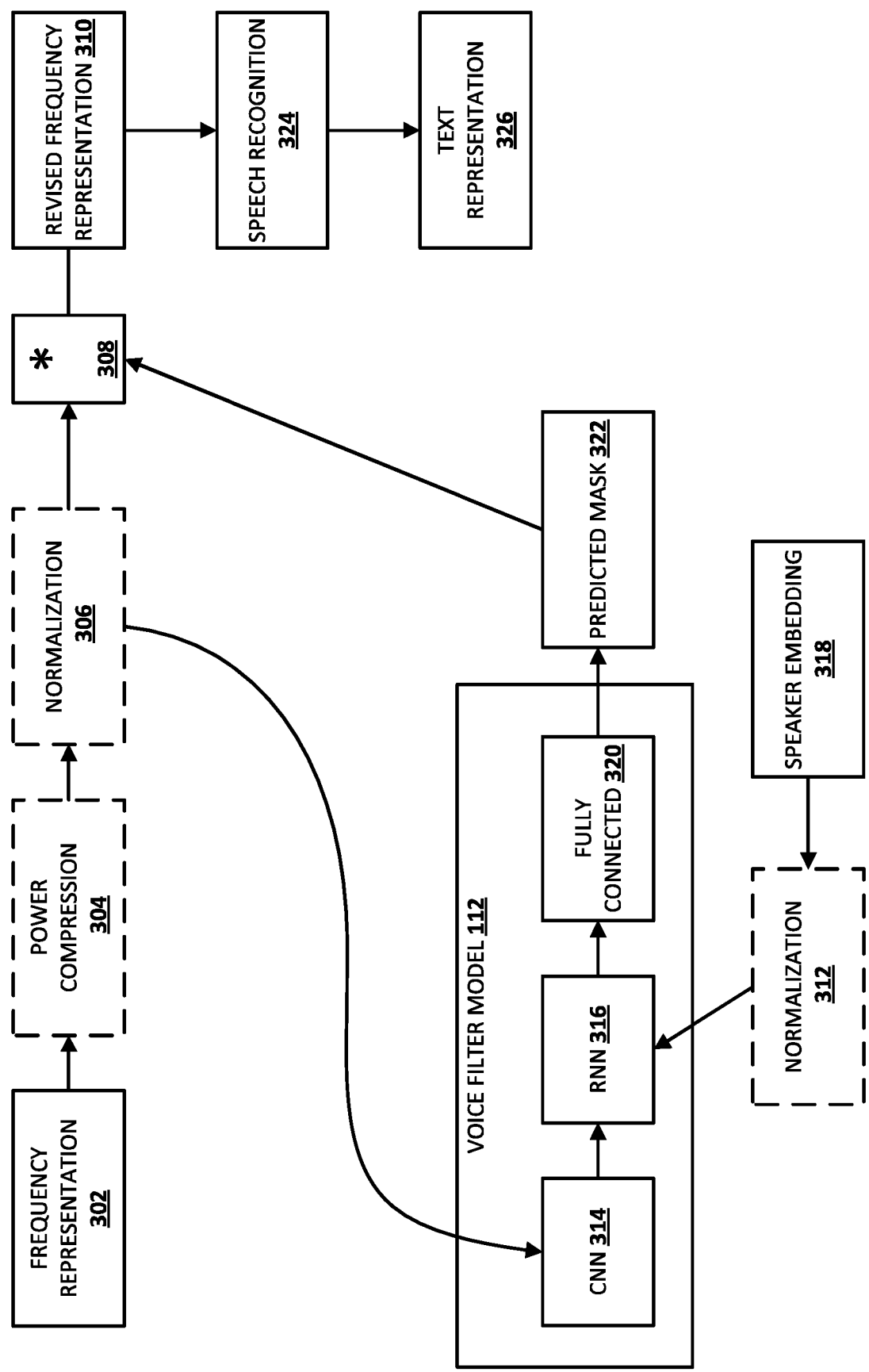
FIG. 3 illustrates an example of generating a revised frequency representation of audio data, using the audio data, a speaker embedding, and a voice filter model in accordance with various implementations disclosed herein.

FIG. 3 illustrates an example of generating a revised frequency representation of audio data using the audio data, a speaker embedding, and a voice filter model. The voice filter model 112 can be the same as voice filter model 112 of FIG. 1, but has been trained (e.g., utilizing process 600 of FIG. 6 as described herein).

In FIG. 3, the voice filter engine (e.g., voice filter engine 104 as illustrated in FIG. 1 and/or FIG. 2) can receive a frequency representation 302 generated using a frequency transformation portion of an ASR engine. The frequency representation 302 can be, for example, streaming audio data that is processed in an online manner (e.g., in real-time or in near real-time) or non-streaming audio data that has been previously recorded and provided to the voice filter engine. The voice filter engine also receives a speaker embedding 318 form a speaker embedding engine (e.g., speaker embedding engine 116 as illustrated in FIG. 1 and/or FIG. 2). The speaker embedding 318 is an embedding for a given human speaker, and can be generated based on processing one or more instances of audio data, from the given speaker, using a speaker embedding model. As described herein, in some implementations, the speaker embedding 318 is previously generated by the speaker embedding engine based on previous instance(s) of audio data from the given speaker. In some of those implementations, the speaker embedding 318 is associated with an account of the given speaker and/or a client device of the given speaker, and the speaker embedding 318 can be provided for utilization with the frequency representation 302 based on the frequency representation 302 coming from the client device and/or the digital system where the account has been authorized.

In many implementations, the voice filter engine can optionally process frequency representation 302 using a power compression process to generate power compression 304. In many implementations, the power compression process can equalize (or partially equalize) the importance of quieter sounds relative to loud sounds in the audio data. Additionally or alternatively, the voice filter engine can optionally process frequency representation 302 using a normalization process to generate normalization 306, and can optionally process speaker embedding 318 using the normalization process to generate normalization 312.

Frequency representation 302 can be applied as input to a convolutional neural network (CNN) portion 314 of voice filter model 112. In many implementations, CNN portion 314 is a one dimensional convolutional neural network. In many implementations, convolutional output generated by the CNN portion 314, as well as speaker embedding 318, can be applied as input to a recurrent neural network (RNN) portion 316 of voice filter model 112. In many implementations, RNN portion 316 can include uni-directional memory units (e.g., long short term memory units (LSTM), gated recurrent units (GRU), and/or additional memory unit(s)). Additionally or alternatively, RNN output generated by the RNN portion 316 can be applied as input to a fully connected feed-forward neural network portion 320 of voice filter model 112 to generate predicted mask 322. In many implementations, CNN portion 314 can be omitted and frequency representation 302 and speaker embedding 318 can both be applied as input to RNN 316.

Frequency representation 302 can be processed with predicted mask 322 to generate revised frequency representation 310. For example, frequency representation 302 can be convolved 308 with predicted mask 322 to generate revised frequency representation 310. In many implementations, text representation 326 can be generated by processing revised frequency representation 310 using a speech recognition process 324 such as processing the revised frequency representation 310 using an ASR model of the ASR engine (not depicted).

In many implementations, the revised frequency representation 310 can: be the same as frequency representation 302 when frequency representation 302 includes only utterance(s) from the speaker corresponding to the speaker embedding 318; be null/zero when the frequency representation 302 lacks any utterances from the speaker corresponding to the speaker embedding 318; or exclude additional sound(s) while isolating utterance(s) from the speaker corresponding to the speaker embedding 318, when the frequency representation 302 includes utterance(s) from the speaker and additional sound(s) (e.g., overlapping utterance(s) of other human speaker(s) and/or additional background noise).

In many implementations, the text representation 326 can be provided to one or more additional components by a voice filter engine, by an ASR engine, and/or by additional engine(s). Although FIG. 3 illustrates generating a single instance of text representation 326 based on a single speaker embedding 318, it is understood that in various implementations, multiple instances of text representations can be generated, with each instance being based on frequency representation 302 and a unique speaker embedding for a unique human speaker.

Figure 4:
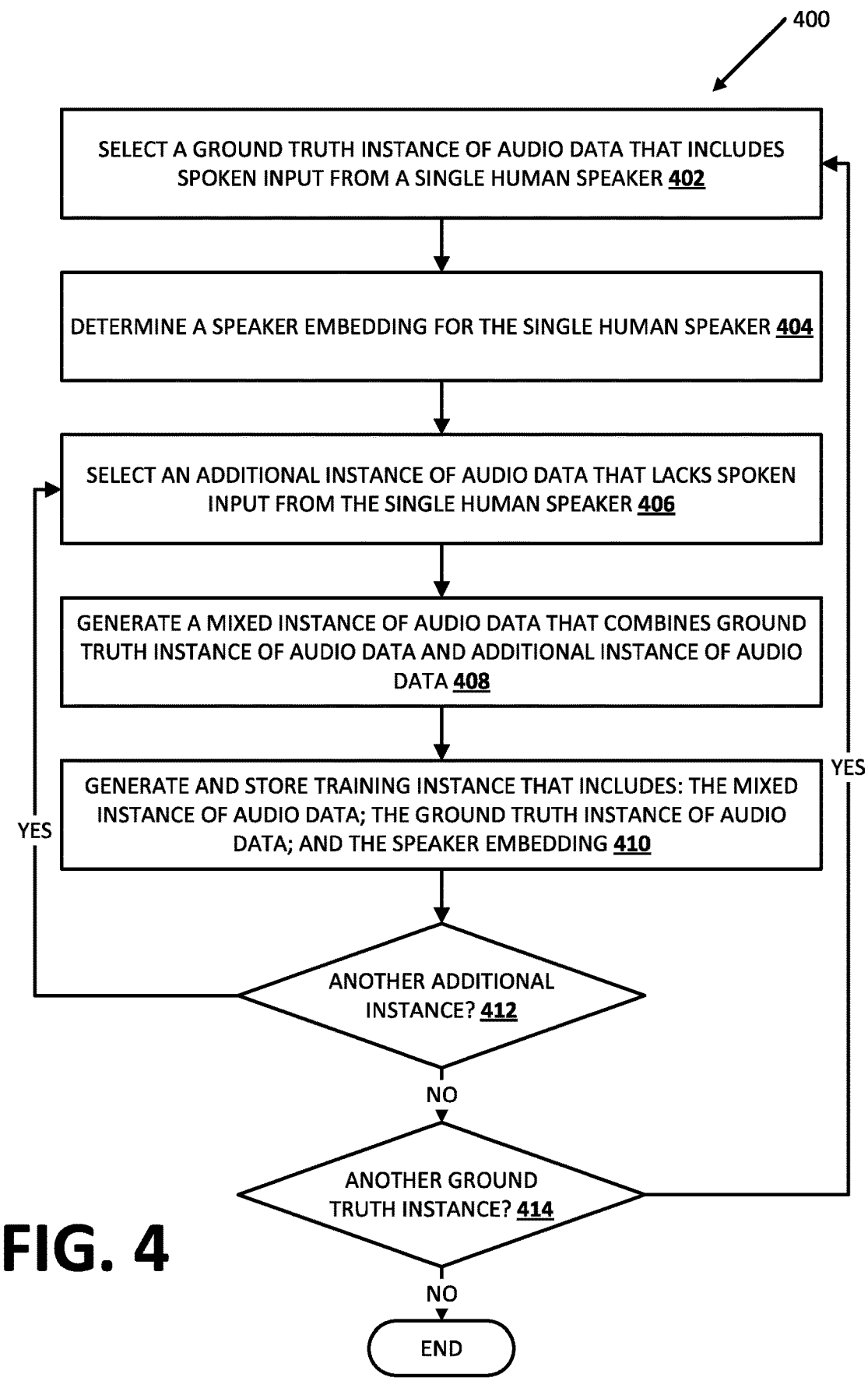
FIG. 4 is a flowchart illustrating an example process of generating training instances, for training a voice filter model, according to various implementations disclosed herein.
Figure 5:
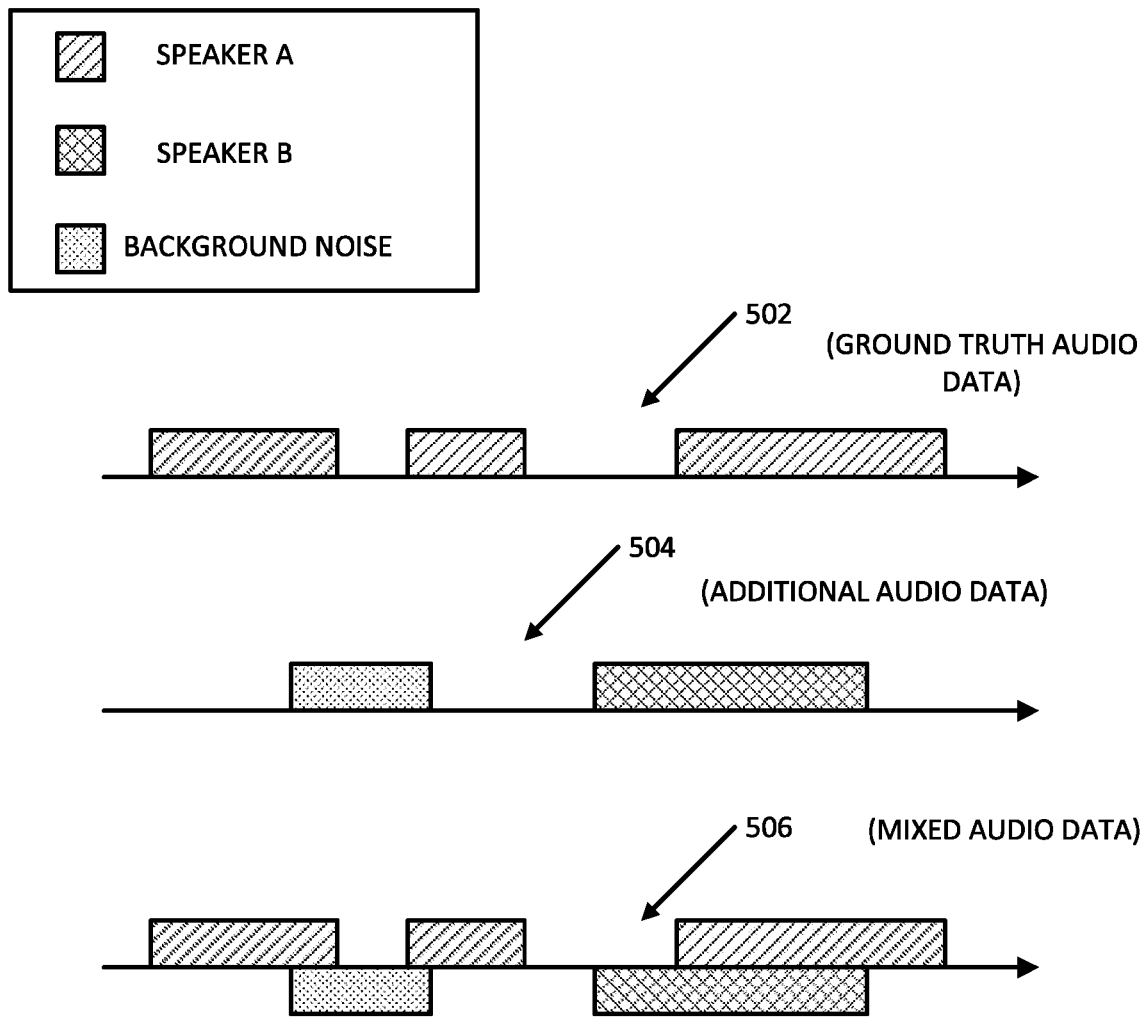
FIG. 5 illustrates examples of using ground truth audio data and additional audio data to generate mixed audio data for use in training instances use to train the voice filter model of FIG. 4.

Turning now to FIG. 4, an example process 400 is illustrated of generating training instances for training a voice filter model according to implementations disclosed herein. For convenience, the operations of certain aspects of the flowchart of FIG. 4 are described with reference to ground truth audio data 502, additional audio data 504, and mixed audio data 506 that are schematically represented in FIG. 5. Also, for convenience, the operations of the flowchart are described with reference to a system that performs the operations. This system may include various components of various computer systems, such as training instance engine 202 and/or one or more of GPU(s), CPU(s), and/or TPU(s). Moreover, while operations of process 400 are shown in a particular order, this is not meant to be limiting. One or more operations may be reordered, omitted, and/or added.

At block 402, the system selects a ground truth instance of audio data that includes spoken input from a single human speaker. For example, the system can select ground truth audio data 502 of FIG. 5. In FIG. 5, the arrow illustrates time and the three diagonal shading areas in the ground truth audio data 502 represent segments of the audio data where "Speaker A" is providing a respective utterance. Notably, the ground truth audio data 502 includes no (or de minimis) additional sounds.

At block 404, the system determines a speaker embedding for the single human speaker. For example, the speaker embedding can be generated by processing one or more segments of the ground truth instance of audio data 502 of FIG. 5, using a speaker embedding model. Additionally or alternatively, the system can determine a speaker embedding associated with the single human speaker of the ground truth instance of audio data.

At block 406, the system selects an additional instance of audio data that lack spoken input from the single human speaker. The additional instance of audio data can include spoken input from other speaker(s) and/or background noise (e.g., music, sirens, air conditioning noise, etc.). For example, the system can select additional instance of audio data 504 schematically illustrated in FIG. 5 which includes an utterance from "Speaker B" (crosshatch shading) and "background noise" (stippled shading). Notably, "Speaker B" is different from "Speaker A".

At block 408, the system generates a mixed instance of audio data that combines the ground truth instance of audio data and the additional instance of audio data. For example, mixed audio data 506 of FIG. 5 is generated by combining ground truth audio data 502 and additional audio data 504. Accordingly, mixed audio data 506 includes the shaded areas from ground truth audio data 502 (diagonal shading) and the shaded areas from additional audio data 504 (crosshatch shading and stippled shading). Accordingly, in mixed audio data 506, both "Speaker A" and "Speaker B" utterance are included, as well as "background noise". Further, parts of "Speaker A" utterances overlap with parts of the "background noise" and with part of "Speaker B" utterances.

At block 410, the system generates and stores a training instance that includes: the mixed instance of audio data, the speaker embedding, and the ground truth instance of audio data. For example, the system can generate and store a training instance that includes: mixed instance of audio data 506, the ground truth instance of audio data 502, and a speaker embedding generated using the ground truth instance of audio data 502.

At block 412, the system determines whether to generate an additional training instance using the same ground truth instance of audio data and the same speaker embedding, but a different mixed instance of audio data that is based on another additional instance. If so, the system proceeds back to block 406 and selects a different additional instance, proceeds to block 408 and generates another mixed instance of audio data that combines the same ground truth instance of audio data and the different additional instance, then proceeds to block 410 and generates and stores a corresponding training instance.

If, if at an iteration of block 412, the system determines not to generate an additional training instance using the same ground truth instance of audio data and the same speaker embedding, the system proceeds to block 414 and determines whether to generate an additional training instance using another ground truth instance of training data. If so, the system performs another iteration of blocks 402, 404, 406, 408, 410, and 412 utilizing a different ground truth instance of audio data with a different human speaker, utilizing a different speaker embedding, and optionally utilizing a different additional instance of audio data.

If, at an iteration of block 414, the system determines not to generate an additional training instance using another ground truth instance of audio data, the system proceeds to block 416 and generating of training instances ends.

Figure 6:
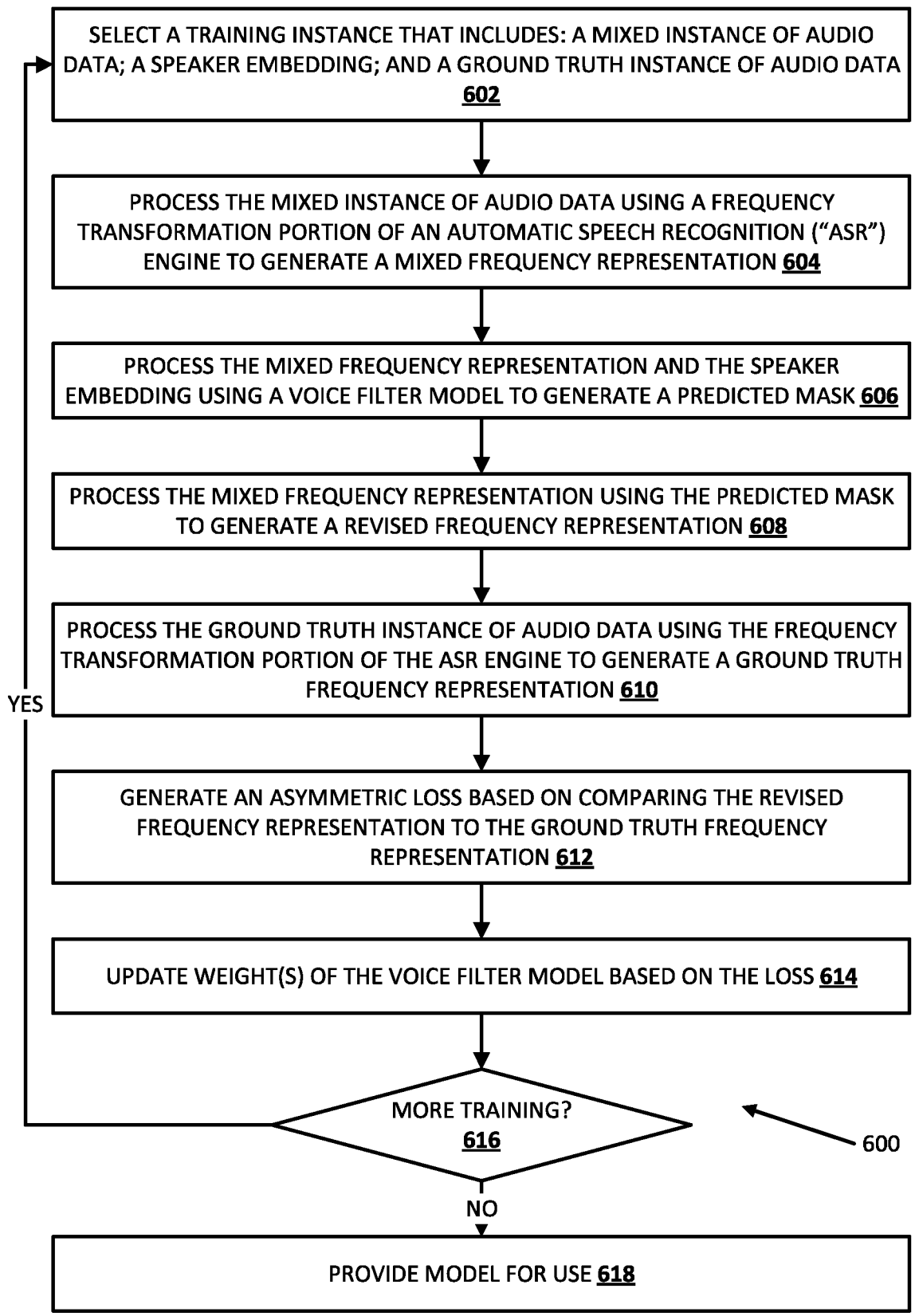
FIG. 6 is a flowchart illustrating an example process of training a voice filter model according to various implementations disclosed herein.

Turning now to FIG. 6, an example process 600 is illustrated of training a voice filter model according to various implementations disclosed herein. For convenience, the operations of the flowchart are described with reference to a system that performs the operations. This system may include various components of various computer systems, such as voice filter engine 104 and/or one or more GPU(s), CPU(s), and/or TPU(s). Moreover, while operations of process 600 are shown in a particular order, this is not meant to be limiting. One or more operations may be reordered, omitted, and/or added.

At block 602, the system selects a training instance that includes a mixed instance of audio data, a speaker embedding, and ground truth audio data. For example, the system can select a training instance generated according to process 400 of FIG. 4.

At block 604, the system processes the mixed instance of audio data using a frequency transformation portion of an ASR engine to generate a mixed frequency representation. In a variety of implementations, the frequency transformation portion of the ASR engine includes a Fourier transformation, such as a fast Fourier transformation. Additionally or alternatively, the frequency transformation can include a filterbank process, which can convert a frequency representation of audio data into filterbank energies.

At block 606, the system processes the mixed frequency representation and the speaker embedding using a voice filter model (e.g., voice filter model 112) to generate a predicted mask.

At block 608, the system processes the mixed frequency representation using the predicted mask to generate a revised frequency representation. In many implementations, the predicted mask is convolved with the mixed frequency representation to generate the revised frequency representation. In various implementations, the predicted mask isolates frequency representations of utterance(s) of the human speaker in the frequency representation of the mixed audio data.

At block 610, the system processes the ground truth instance of audio data using the frequency transformation portion of the ASR engine to generate a ground truth frequency representation 610.

At block 612, the system generates an asymmetric loss based on comparing the revised frequency representation to the ground truth frequency representation. In many implementations, an existing ASR system inherently has some robustness against background noise, which can lead to over suppression of utterance(s) captured in audio data. An asymmetric loss can be more tolerant to under-suppression errors, and can additionally and/or alternatively be used to penalize over suppression by improving speech recognition when speech is overlapped with additional noise(s). In many implementations, the system generates additional and/or alternative loss(es) which are not asymmetric.

At block 614, the system updates one or more weights of the voice filter model based on the generated loss (i.e., backpropagation).

At block 616, the system determines whether to perform more training of the voice filter model. If so, the system proceeds back to block 602, selects an additional training instance, then performs an iteration of blocks 604, 606, 608, 610, 612, and 614 based on the additional training instance, and then performs an additional iteration of block 616. In some implementations, the system can determine to perform more if there are one or more additional unprocessed training instances and/or if other criterion/criteria are not yet satisfied. The other criterion/criteria can include, for example, whether a threshold number of epochs have occurred and/or a threshold duration of training has occurred. Although process 600 is described with respect to a non-batch learning technique, batch learning may additionally and/or alternatively be utilized.

If, at an iteration of block 616, the system determines not to perform more training, the system can proceed to block 618 where the system considers the voice filter model trained, and provides the voice filter model for use. For example, the system can provide the trained voice filter model for use in process 700 (FIG. 7) as described herein.

Figure 7:
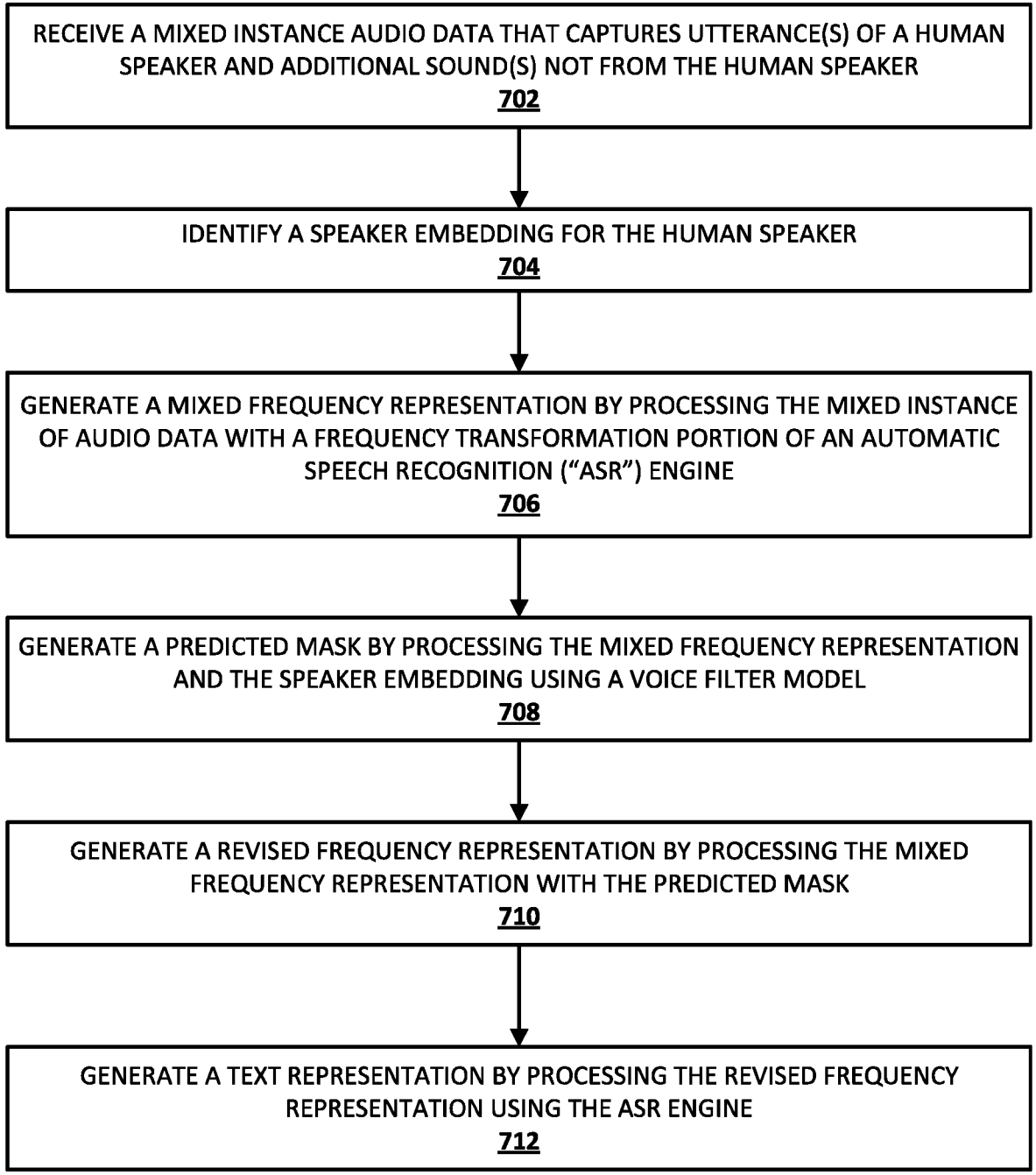
FIG. 7 is a flowchart illustrating an example process of generating a revised frequency representation of audio data using the audio data, speaker embeddings, and a voice filter model, according to various implementations disclosed herein.
Figure 8:
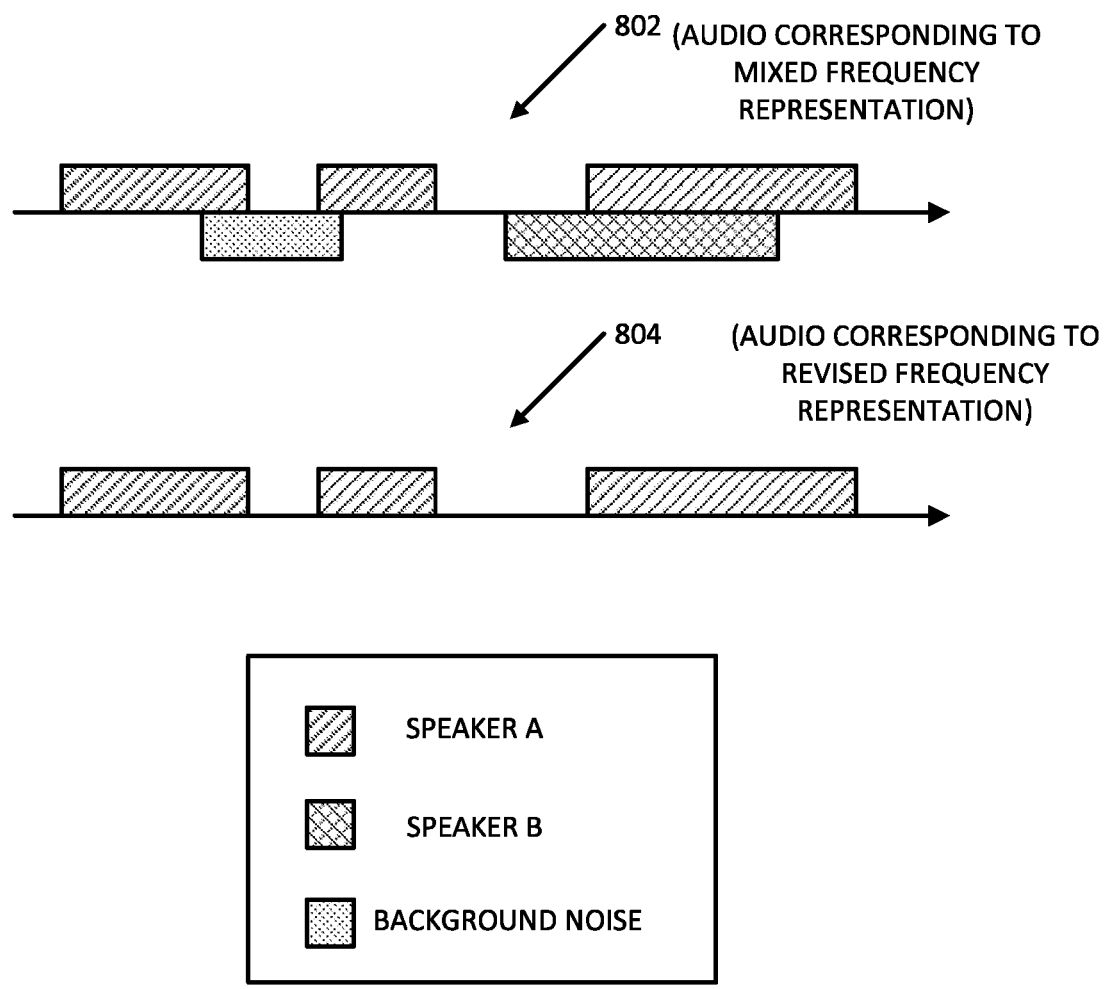
FIG. 8 illustrates an example of audio data corresponding to a frequency representation and audio data corresponding to a revised version of the frequency representation that can be generated according to various implementations disclosed herein.

Turning now to FIG. 7, a process 700 of generating refined audio data using the audio data, a speaker embedding, and a voice filter model, according to various implementations disclosed herein. For convenience, the operations of certain aspects of the flowchart of FIG. 7 are described with reference to audio data corresponding to a mixed frequency representation 802 and audio data corresponding to a revised frequency representation 804 that are schematically represented in FIG. 8. Also, for convenience, the operations of the flowchart of FIG. 7 are described with reference to a system that performs the operations. This system may include various components of various computer systems, such as voice filter engine 104, and/or one or more GPU(s), CPU(s), and/or TPU(s). In various implementations, one or more blocks of FIG. 7 may be performed by a client device using a speaker embedding model and a machine learning model stored locally at the client device. Moreover, while operations of process 700 are shown in a particular order, this is not meant to be limiting. One or more operations may be reordered, omitted, and/or added.

At block 702, the system receives a mixed instance of audio data that captures utterance(s) of a human speaker and additional sound(s) that are not from the human speaker. In some implementations, the audio data is streaming audio data. As one example, at block 702 the system can receive the audio data corresponding to the mixed frequency representation 802 of FIG. 8, which includes utterances from "Speaker A" (diagonal shading), as well as utterances from "Speaker B" (stippled shading) and "background noise" (crosshatch shading).

At block 704, the system identifies a previously generated speaker embedding for the human speaker. For example, the system can select a previously generated speaker embedding for "Speaker A". For instance, the speaker embedding could have been previously generated based on an immediately preceding utterance from "Speaker A" that was received at the client device that generated the audio data—and can be selected based on "Speaker A" being the speaker of the immediately preceding utterance. Also, for instance, the speaker embedding could have been previously generated during an enrollment process performed by "Speaker A" for an automated assistant, client device, and/or other digital system. In such an instance, the speaker embedding can be selected based on the audio data being generated by the client device and/or via an account of "Speaker A" for the digital system. As one particular instance, audio data received at block 702 can be determined to be from "Speaker A" based on "Speaker A" being recently verified as an active user for the digital system. For example, voice fingerprinting, image recognition, a passcode, and/or other verification may have been utilized to determine "Speaker A" is currently active and, as a result, the speaker embedding for "Speaker A" can be selected.

At block 706, the system generates a mixed frequency representation by processing the audio data with a frequency transformation portion of an ASR engine. For example, the frequency transformation portion of the ASR engine can include a Fast Fourier Transformation (FFT), where the audio data is transformed using the FFT to generate a FFT representation of the audio data, and where the FFT representation of the audio data is utilized by the system as the mixed frequency representation. In many implementations, the frequency transformation portion of the ASR engine can include a FFT as well as a filterbank transformation, where the audio data is transformed using the FFT to generate a FFT representation of the audio data, the FFT representation is transformed using the filterbank transformation to generate a filterbank representation, and where the filterbank representation of the audio data is utilized by the system as the mixed frequency representation.

At block 708, the system generates a predicted mask by processing the mixed frequency representation and the speaker embedding using a voice filter model. In many implementations, the voice filter model can be trained in accordance with process 600 of FIG. 6 as described herein.

At block 710, the system generates a revised frequency representation by processing the mixed frequency representation with the predicted mask. For example, the mixed frequency representation can be convolved with the predicted mask to generate the revised frequency representation. For example, the system can generate a revised frequency representation corresponding to audio data 804 schematically illustrated in FIG. 8, in which only utterances of "Speaker A" remain.

At block 712, the system generates a text representation of the utterance(s) of the human speaker by processing the revised frequency representation using the ASR engine. In many implementations, the text representation can be text, a symbolic representation of text, and/or additional representation(s) of the text. For example, the system can generate a text representation of the utterance(s) of "Speaker A" by processing the revised frequency representation 804 using the ASR engine.

In many implementations, when the mixed frequency representation is a FFT representation (as described herein with respect to block 706), the system can process the revised frequency representation (i.e., a revised FFT representation of the audio data) using a filterbank transformation to generate a filterbank representation. The filterbank representation can be processed using an ASR model portion of the ASR engine to generate the text representation of the utterance(s) of the human speaker. In additional and/or alternative implementations, when the mixed frequency representation is a filterbank representation (as described herein with respect to block 706), the system can process the revised frequency representation (i.e., a revised filterbank representation of the audio data) using the ASR model portion of the ASR engine to generate the text representation of the utterance(s) of the human speaker.

Figure 9:
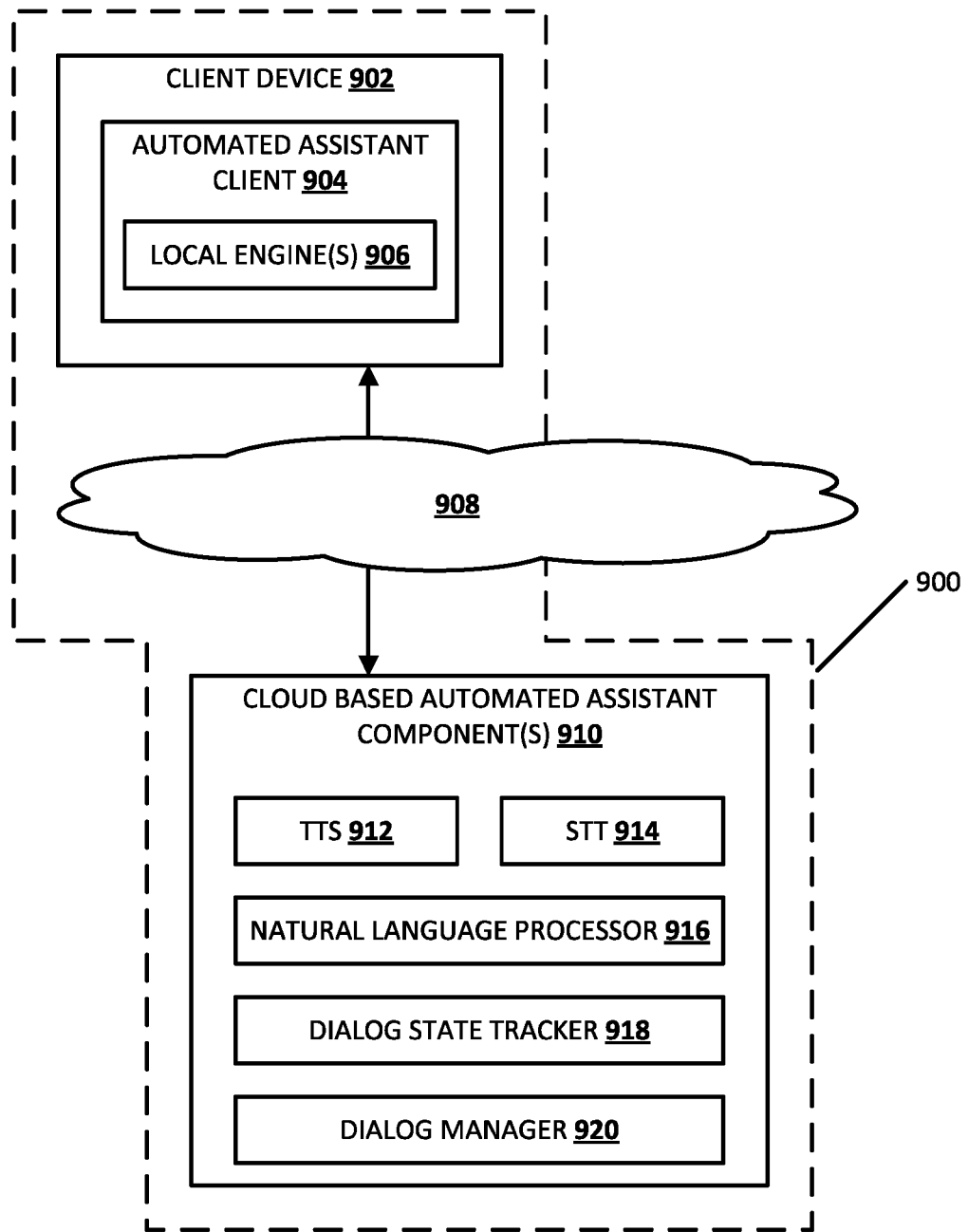
FIG. 9 illustrates a block diagram of another example environment in which implementations disclosed herein may be implemented.

Turning now to FIG. 9, an example environment is illustrated where various implementations can be performed. FIG. 9 is described initially, and includes a client computing device 902, which executes an instance of an automated assistant client 904. One or more cloud-based automated assistant components 910 can be implemented on one or more computing systems (collectively referred to as a "cloud" computing system) that are communicatively coupled to client device 902 via one or more local and/or wide area networks (e.g., the Internet) indicated generally at 908.

An instance of an automated assistant client 904, by way of its interactions with one or more cloud-based automated assistant components 910, may form what appears to be, from the user's perspective, a logical instance of an automated assistant 900 with which the user may engage in a human-to-computer dialog. An instance of such an automated assistant 900 is depicted in FIG. 9. It thus should be understood that in some implementations, a user that engages with an automated assistant client 904 executing on client device 902 may, in effect, engage with his or her own logical instance of an automated assistant 900. For the sakes of brevity and simplicity, the term "automated assistant" as used herein as "serving" a particular user will often refer to the combination of an automated assistant client 904 executing on a client device 902 operated by the user and one or more cloud-based automated assistant components 910 (which may be shared amongst multiple automated assistant clients of multiple client computing devices). It should also be understood that in some implementations, automated assistant 900 may respond to a request from any user regardless of whether the user is actually "served" by that particular instance of automated assistant 900.

The client computing device 902 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 902 may optionally operate one or more other applications that are in addition to automated assistant client 904, such as a message exchange client (e.g., SMS, MMS, online chat), a browser, and so forth. In some of those various implementations, one or more of the other applications can optionally interface (e.g., via an application programming interface) with the automated assistant 900, or include their own instance of an automated assistant application (that may also interface with the cloud-based automated assistant component(s) 910).

Automated assistant 900 engages in human-to-computer dialog sessions with a user via user interface input and output devices of the client device 902. To preserve user privacy and/or to conserve resources, in many situations a user must often explicitly invoke the automated assistant 900 before the automated assistant will fully process a spoken utterance. The explicit invocation of the automated assistant 900 can occur in response to certain user interface input received at the client device 902. For example, user interface inputs that can invoke the automated assistant 900 via the client device 902 can optionally include actuations of a hardware and/or virtual button of the client device 902. Moreover, the automated assistant client can include one or more local engines 906, such as an invocation engine that is operable to detect the presence of one or more spoken invocation phrases. The invocation engine can invoke the automated assistant 900 in response to detection of one of the spoken invocation phrases. For example, the invocation engine can invoke the automated assistant 900 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 106, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 900. As used herein, "invoking" the automated assistant 900 can include causing one or more previously inactive functions of the automated assistant 900 to be activated. For example, invoking the automated assistant 900 can include causing one or more local engines 906 and/or cloud-based automated assistant components 910 to further process audio data frames based on which the invocation phrase was detected, and/or one or more following audio data frames (whereas prior to invoking no further processing of audio data frames was occurring). For instance, local and/or cloud-based components can generate refined versions of audio data and/or perform other processing in response to invocation of the automated assistant 900. In some implementations, the spoken invocation phrase can be processed to generate a speaker embedding that is used in generating a refined version of audio data that follows the spoken invocation phrase. In some implementations, the spoken invocation phrase can be processed to identify an account associated with a speaker of the spoken invocation phrase, and a stored speaker embedding associated with the account utilized in generating a refined version of audio data that follows the spoken invocation phrase.

The one or more local engine(s) 906 of automated assistant 900 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 902 is relatively constrained in terms of computing resources (e.g., processor cycles, memory, battery, etc.), the local engines 906 may have limited functionality relative to any counterparts that are included in cloud-based automated assistant components 910.

Cloud-based automated assistant components 910 leverage the virtually limitless resources of the cloud to perform more robust and/or more accurate processing of audio data, and/or other user interface input, relative to any counterparts of the local engine(s) 906. Again, in various implementations, the client device 902 can provide audio data and/or other data to the cloud-based automated assistant components 910 in response to the invocation engine detecting a spoken invocation phrase, or detecting some other explicit invocation of the automated assistant 900.

The illustrated cloud-based automated assistant components 910 include a cloud-based TTS module 912, a cloud-based STT module 914, a natural language processor 916, a dialog state tracker 918, and a dialog manager 920. In some implementations, one or more of the engines and/or modules of automated assistant 900 may be omitted, combined, and/or implemented in a component that is separate from automated assistant 900. Further, in some implementations automated assistant 900 can include additional and/or alternative engines and/or modules. Cloud-based STT module 914 can convert audio data into text, which may then be provided to natural language processor 916. In various implementations, the cloud-based STT module 914 can covert audio data into text based at least in part on revised version(s) of frequency representation that are provided by the voice filter engine 104.

Cloud-based TTS module 912 can convert textual data (e.g., natural language responses formulated by automated assistant 900) into computer-generated speech output. In some implementations, TTS module 912 may provide the computer-generated speech output to client device 902 to be output directly, e.g., using one or more speakers. In other implementations, textual data (e.g., natural language responses) generated by automated assistant 900 may be provided to one of the local engine(s) 906, which may then convert the textual data into computer-generated speech that is output locally.

Natural language processor 916 of automated assistant 900 processes free form natural language input and generates, based on the natural language input, annotated output for use by one or more other components of the automated assistant 900. For example, the natural language processor 916 can process natural language free-form input that is textual input that is a conversion, by STT module 914, of audio data provided by a user via client device 902. The generated annotated output may include one or more annotations of the natural language input and optionally one or more (e.g., all) of the terms of the natural language input.

In some implementations, the natural language processor 916 is configured to identify and annotate various types of grammatical information in natural language input. In some implementations, the natural language processor 916 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 916 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 916 may rely on annotations from one or more other components of the natural language processor 916. In some implementations, in processing a particular natural language input, one or more components of the natural language processor 916 may use related prior input and/or other related data outside of the particular natural language input to determine one or more annotations.

In some implementations, dialog state tracker 918 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 920 may be configured to map a current dialog state, e.g., provided by dialog state tracker 918, to one or more "responsive actions" of a plurality of candidate responsive actions that are then performed by automated assistant 900. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 900 outputting additional natural language dialog. This responsive dialog may include, for instance, requests that the user provide parameters for some action (i.e., fill slots) that dialog state tracker 918 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Figure 10:
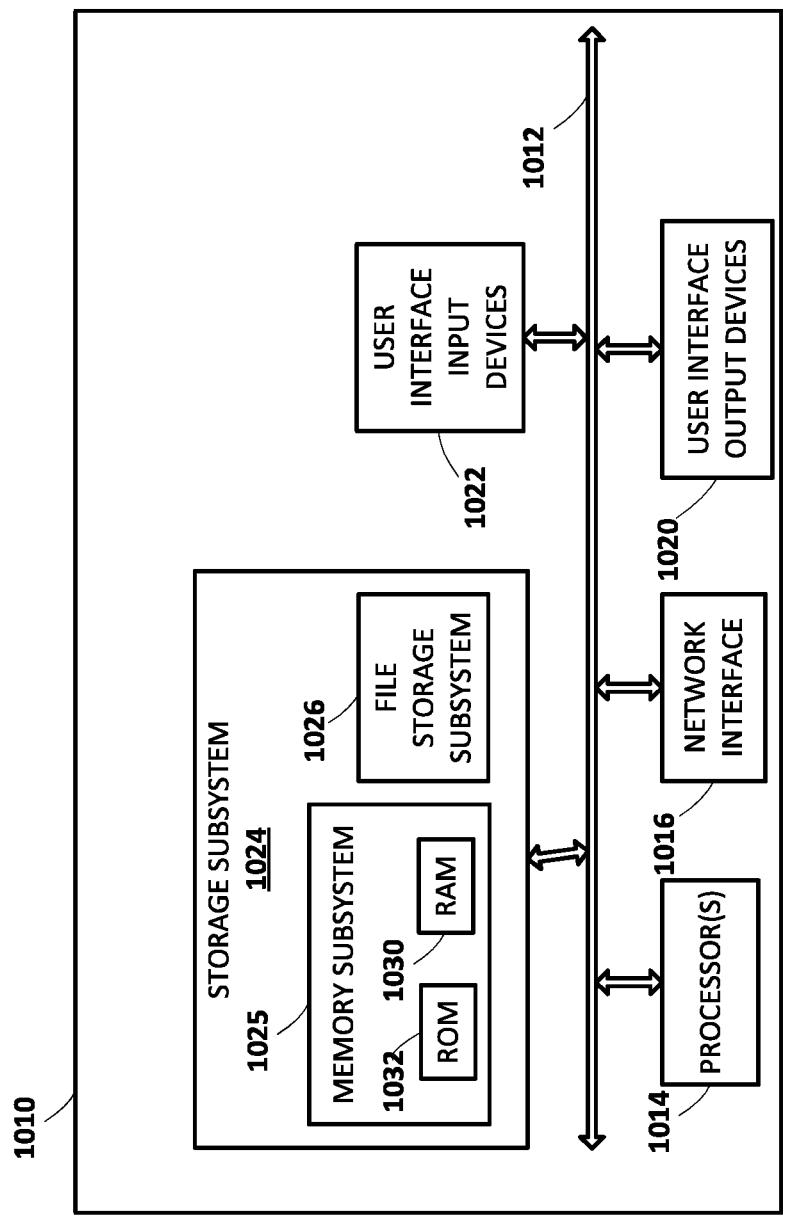
FIG. 10 illustrates an example architecture of a computing device.

FIG. 10 is a block diagram of an example computing device 1010 that may optionally be utilized to perform one or more aspects of techniques described herein. In some implementations, one or more of a client computing device, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of one or more of the processes of FIG. 4, FIG. 6, and/or FIG. 7, as well as to implement various components depicted in FIG. 1 and/or FIG. 9.

These software modules are generally executed by processor 1014 alone or in combination with other processors. Memory 1025 used in the storage subsystem 1024 can include a number of memories including a main random access memory ("RAM") 1030 for storage of instructions and data during program execution and a read only memory ("ROM") 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided that includes receiving audio data that captures an utterance of a human speaker and that also captures one or more additional sounds that are not from the human speaker. The method further includes processing the audio data with a frequency transformation portion of an automatic speech recognition ("ASR") engine to generate a frequency representation of the audio data. The method further includes generating a revised version of the frequency representation that includes one or more portions of the frequency representation corresponding to the utterance and that excludes one or more other portions of the frequency representation that capture the one or more additional sounds, and wherein generating the revised version of the frequency representation includes processing, using a voice filter model, the frequency representation and a speaker embedding to generate a predicted mask that is conditioned on both the frequency representation and the speaker embedding, wherein the speaker embedding corresponds to the human speaker. The method further includes generating the revised version of the frequency representation by processing the frequency representation using the predicted mask. The method further includes processing the revised version of the frequency representation using a speech recognition portion of the ASR engine to generate a text representation of the utterance of the human speaker.

These and other implementations of the technology disclosed herein can include one or more of the following features.

In some implementations, processing the audio data with the frequency transformation portion of the ASR engine to generate the frequency representation of the audio data further includes processing the audio data using the frequency transformation portion of the ASR engine to generate output. In some implementations, the method further includes processing the output using a power law compression process to generate the frequency representation.

In some implementations, prior to generating the revised version of the frequency representation, the method further includes normalizing the frequency representation using a normalization process and normalizing the speaker embedding using a normalization process.

In some implementations, processing, using the voice filter model, the frequency representation and the speaker embedding to generate the predicted mask that is conditioned on both the frequency representation and the speaker embedding further includes processing the frequency representation using a one dimensional convolutional neural network portion of the voice filter model to generate convolutional output. In some implementations, the method further includes processing the convolutional output and the speaker embedding using a unidirectional long short term memory model portion of the voice filter output to generate recurrent output. In some implementations, the method further includes processing the recurrent output using a feed-forward neural network portion of the voice filter model to generate the predicted mask.

In some implementations, generating the revised version of the frequency representation by processing the frequency representation using the predicted mask includes processing the frequency representation using the predicted mask by convolving the frequency representation using the predicted mask.

In some implementations, the speaker embedding is generated by processing one or more instances of speaker audio data corresponding to the human speaker using a speaker embedding model. In some versions of those implementations, the speaker audio data processed in generating the speaker embedding includes one or more enrollment utterances spoken by a human speaker during enrollment with a digital system. In some versions of those implementations, the speaker embedding is stored locally at a client device during the enrollment with the digital system, and wherein the speaker embedding is used in generating the revised frequency representation of the audio data In some implementations, the one or more additional sounds that are not from the human speaker captured in the received audio data comprises background noise not from an additional human speaker.

In some implementations, the one or more additional sounds that are not from the human speaker captured in the received audio data comprises an utterance of an additional human speaker.

In some implementations, the audio data is captured via one or more microphones of a client device, and wherein the speaker embedding corresponding to the human speaker is generated after at least part of the audio data is captured via the one or more microphones of the client device.

In some implementations, the audio data wherein the audio data is captured via one or more microphones of a client device, and wherein the speaker embedding corresponding to the human speaker is generated prior to the audio data being captured via the one or more microphones of the client device. In some versions of those implementations, the speaker embedding is selected based on sensor data captured at the client device indicating that the human speaker is currently interfacing with the client device.

In some implementations, a method of training a voice filter machine learning model to generate revised versions of frequency representations of audio data that isolate any utterances of a target human speaker is provided, the method implemented by one or more processors and including identifying an instance of audio data that includes spoken input from only a first human speaker. The method further includes identifying a speaker embedding for the first human speaker. The method further includes identifying an additional instance of audio data that lacks any spoken input from the first human speaker, and that includes spoken input from at least one additional human speaker. The method further includes generating a mixed instance of audio data that combines the instance of audio data and the additional instance of audio data. The method further includes processing the instance of audio data using a frequency transformation portion of an automatic speech recognition ("ASR") engine to generate a frequency representation of the instance of audio data. The method further includes processing the mixed instance of audio data using the frequency transformation portion of the ASR engine to generate a mixed frequency representation of the mixed audio data. The method further includes processing the mixed frequency representation and the speaker embedding using the voice filter model to generate a predicted mask. The method further includes processing the mixed frequency representation using the predicted mask to generate a predicted frequency representation. The method further includes determining an asymmetric loss based on comparison of the frequency representation and the predicted frequency representation. The method further includes updating one or more weights of the voice filter model based on the loss.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
    receiving audio data that captures an utterance of a human speaker and that also captures one or more additional sounds that are not from the human speaker;
    processing the audio data with a frequency transformation portion of an automatic speech recognition ("ASR") engine to generate a frequency representation of the audio data, wherein the frequency representation of the audio data includes one or more portions corresponding to the utterance of the human speaker and includes one or more portions corresponding to the one or more additional sounds that are not from the human speaker;
    generating a revised version of the frequency representation, wherein the revised version of the frequency representation differs from the frequency representation, wherein the revised version of the frequency representation includes the one or more portions of the frequency representation corresponding to the utterance of the human speaker, and wherein the revised version of the frequency representation of the audio data does not include the one or more other portions of the frequency representation corresponding to the one or more additional sounds that are not from the human speaker, and wherein generating the revised version of the frequency representation comprises:
        processing, using a voice filter model, the frequency representation and a speaker embedding to generate a predicted mask that is conditioned on both the frequency representation and the speaker embedding, wherein the speaker embedding corresponds to the human speaker;
        generating the revised version of the frequency representation by processing the frequency representation using the predicted mask, wherein the processing comprises convolving the frequency representation using the predicted mask; and
    processing the revised version of the frequency representation using a speech recognition portion of the ASR engine to generate a text representation of the utterance of the human speaker.

2. The method of claim 1, wherein processing the audio data with the frequency transformation portion of the ASR engine to generate the frequency representation of the audio data further comprises:
    processing the audio data using the frequency transformation portion of the ASR engine to generate output; and
    processing the output using a power law compression process to generate the frequency representation.

3. The method of claim 1, further comprising:
    prior to generating the revised version of the frequency representation, normalizing the frequency representation using a normalization process and normalizing the speaker embedding using a normalization process.

4. The method of claim 1, wherein processing, using the voice filter model, the frequency representation and the speaker embedding to generate the predicted mask that is conditioned on both the frequency representation and the speaker embedding comprises:
    processing the frequency representation using a one dimensional convolutional neural network portion of the voice filter model to generate convolutional output;
    processing the convolutional output and the speaker embedding using a unidirectional long short term memory model portion of the voice filter output to generate recurrent output; and
    processing the recurrent output using a feed-forward neural network portion of the voice filter model to generate the predicted mask.

5. The method of claim 1, wherein the speaker embedding is generated by processing one or more instances of speaker audio data corresponding to the human speaker using a speaker embedding model.

6. The method of claim 5, wherein the speaker audio data processed in generating the speaker embedding comprises one or more enrollment utterances spoken by a human speaker during enrollment with a digital system.

7. The method of claim 6, wherein the speaker embedding is stored locally at a client device during the enrollment with the digital system, and wherein the speaker embedding is used in generating the revised frequency representation of the audio data.

8. The method of claim 1, wherein the one or more additional sounds that are not from the human speaker captured in the received audio data comprises background noise not from an additional human speaker.

9. The method of claim 1, wherein the one or more additional sounds that are not from the human speaker captured in the received audio data comprises an utterance of an additional human speaker.

10. The method of claim 1, wherein the audio data is captured via one or more microphones of a client device, and wherein the speaker embedding corresponding to the human speaker is generated after at least part of the audio data is captured via the one or more microphones of the client device.

11. The method of claim 1, wherein the audio data is captured via one or more microphones of a client device, and wherein the speaker embedding corresponding to the human speaker is generated prior to the audio data being captured via the one or more microphones of the client device.

12. The method of claim 11, wherein the speaker embedding is selected based on sensor data captured at the client device indicating that the human speaker is currently interfacing with the client device.

13. A method of training a voice filter machine learning model to generate revised versions of frequency representations of audio data that isolate any utterances of a target human speaker, the method implemented by one or more processors and comprising:
    identifying an instance of audio data that includes spoken input from only a first human speaker;
    identifying a speaker embedding for the first human speaker;
    identifying an additional instance of audio data that lacks any spoken input from the first human speaker, and that includes spoken input from at least one additional human speaker;
    generating a mixed instance of audio data that combines the instance of audio data and the additional instance of audio data;
    processing the instance of audio data using a frequency transformation portion of an automatic speech recognition ("ASR") engine to generate a frequency representation of the instance of audio data;

processing the mixed instance of audio data using the frequency transformation portion of the ASR engine to generate a mixed frequency representation of the mixed audio data;

processing the mixed frequency representation and the speaker embedding using the voice filter model to generate a predicted mask;

processing the mixed frequency representation using the predicted mask to generate a predicted frequency representation, wherein the processing comprises convolving the mixed frequency representation using the predicted mask;

determining an asymmetric loss based on comparison of the frequency representation and the predicted frequency representation, wherein an asymmetric loss function is used in determining the asymmetric loss and wherein the asymmetric loss is distinct from a mean squared error loss; and updating one or more weights of the voice filter model based on the loss.

14. A client device, comprising:
one or more microphones;
memory storing instructions;
one or more processors configured to execute the instructions to:
  receive audio data, detected via the one or microphones, that captures an utterance of a human speaker and that also captures one or more additional sounds that are not from the human speaker;
  process the audio data with a frequency transformation portion of an automatic speech recognition ("ASR") engine to generate a frequency representation of the audio data, wherein the frequency representation of the audio data includes one or more portions corresponding to the utterance of the human speaker and includes one or more portions corresponding to the one or more additional sounds that are not from the human speaker;
  generate a revised version of the frequency representation, wherein the revised version of the frequency representation differs from the frequency representation, wherein the revised version of the frequency representation includes the one or more portions of the frequency representation corresponding to the utterance of the human speaker, and wherein the revised version of the frequency representation of the audio data does not include the one or more other portions of the frequency representation corresponding to the one or more additional sounds that are not from the human speaker, and wherein generating the revised version of the frequency representation comprises:
    process, using a voice filter model, the frequency representation and a speaker embedding to generate a predicted mask that is conditioned on both the frequency representation and the speaker embedding, wherein the speaker embedding corresponds to the human speaker;
    generate the revised version of the frequency representation by processing the frequency representation using the predicted mask, wherein the processing comprises convolving the frequency representation using the predicted mask; and
  process the revised version of the frequency representation using a speech recognition portion of the ASR engine to generate a text representation of the utterance of the human speaker.

* * * * *